United States Patent
Nii

(10) Patent No.: US 9,026,178 B2
(45) Date of Patent: May 5, 2015

(54) STATE BASED MOBILE PHONE WITH A FIRST DISPLAY MODULE AND A SECOND DISPLAY MODULE

(75) Inventor: Hideaki Nii, Osaka (JP)

(73) Assignee: KYOCERA Corporation, Kyoto (JP)

(*) Notice: Subject to any disclaimer, the term of this patent is extended or adjusted under 35 U.S.C. 154(b) by 482 days.

(21) Appl. No.: 12/977,954

(22) Filed: Dec. 23, 2010

(65) Prior Publication Data

US 2011/0159928 A1 Jun. 30, 2011

(30) Foreign Application Priority Data

Dec. 24, 2009 (JP) ................. 2009-293130

(51) Int. Cl.
H04M 1/00 (2006.01)
H04B 1/38 (2006.01)
H04M 1/02 (2006.01)
H04M 1/725 (2006.01)

(52) U.S. Cl.
CPC .......... *H04M 1/0237* (2013.01); *H04M 1/0233* (2013.01); *H04M 1/72572* (2013.01); *H04M 2250/10* (2013.01); *H04M 2250/16* (2013.01)

(58) Field of Classification Search
CPC ............... H04M 2250/22; H04M 2250/16; H04M 1/0235; H04M 1/0245; H04M 1/0237; H04M 1/0247; H04M 1/0214; H04M 1/72552; H04M 1/72566; H04M 1/0216; H04M 1/0239; H04M 1/72563; H04M 1/72569; H04M 1/72575
USPC ............... 455/566; 361/679.04; 345/204, 4, 5
See application file for complete search history.

(56) References Cited

U.S. PATENT DOCUMENTS

| 6,327,482 | B1 | 12/2001 | Miyashita |
| 7,953,431 | B2 | 5/2011 | Cheon et al. |
| 8,301,203 | B2* | 10/2012 | Watanabe ...................... 455/566 |
| 2006/0271864 | A1* | 11/2006 | Satterfield et al. ............ 715/764 |
| 2009/0051666 | A1* | 2/2009 | Choi et al. ..................... 345/173 |
| 2009/0098888 | A1* | 4/2009 | Yoon ........................... 455/456.2 |
| 2010/0188350 | A1* | 7/2010 | Sawada ......................... 345/173 |
| 2010/0259515 | A1* | 10/2010 | Kohara ......................... 345/204 |
| 2011/0012931 | A1* | 1/2011 | Abe ............................... 345/671 |
| 2011/0143769 | A1* | 6/2011 | Jones et al. ................ 455/456.1 |
| 2011/0143815 | A1* | 6/2011 | Inami ............................ 455/566 |
| 2012/0133604 | A1* | 5/2012 | Ishizuka et al. ............... 345/173 |
| 2012/0256859 | A1* | 10/2012 | Noma ............................ 345/173 |
| 2012/0274540 | A1* | 11/2012 | Inami et al. .................... 345/1.1 |
| 2012/0274541 | A1* | 11/2012 | Inami et al. .................... 345/1.3 |
| 2012/0274551 | A1* | 11/2012 | Ishizuka et al. ............... 345/156 |
| 2012/0274613 | A1* | 11/2012 | Ishizuka ....................... 345/204 |
| 2012/0278734 | A1* | 11/2012 | Ishizuka et al. ............... 715/752 |

FOREIGN PATENT DOCUMENTS

| JP | 11-341121 A | 12/1999 |
| JP | 2005-222478 | 8/2005 |
| JP | 2007-87402 A | 4/2007 |
| JP | 2007-110394 | 4/2007 |

* cited by examiner

*Primary Examiner* — Allahyar Kasraian
(74) *Attorney, Agent, or Firm* — Procopio, Cory, Hargreaves & Savitch LLP

(57) ABSTRACT

A method for operating a mobile terminal device comprising at least two displays is disclosed. Information of a first group on a first display module is displayed, if only a first display module is externally exposed. Information of a second group different from the first group on the first display module and a second display module is displayed, if both the first display module and the second display module are externally exposed.

1 Claim, 26 Drawing Sheets

Figure 5B

| Date and time | Details | Identification Flag | |
|---|---|---|---|
| | | Business | Private |
| 12/9/2009 10:00 | Project meeting at Meeting room A | 1 | |
| 12/9/2009 15:00 | External meeting xx Co., Ltd. | 1 | |
| 12/9/2009 18:00 | Year-end party Friend | | 1 |
| ... | ... | ... | ... |
| ... | ... | ... | ... |
| ... | ... | ... | ... |
| ... | ... | ... | ... |
| ... | ... | ... | ... |

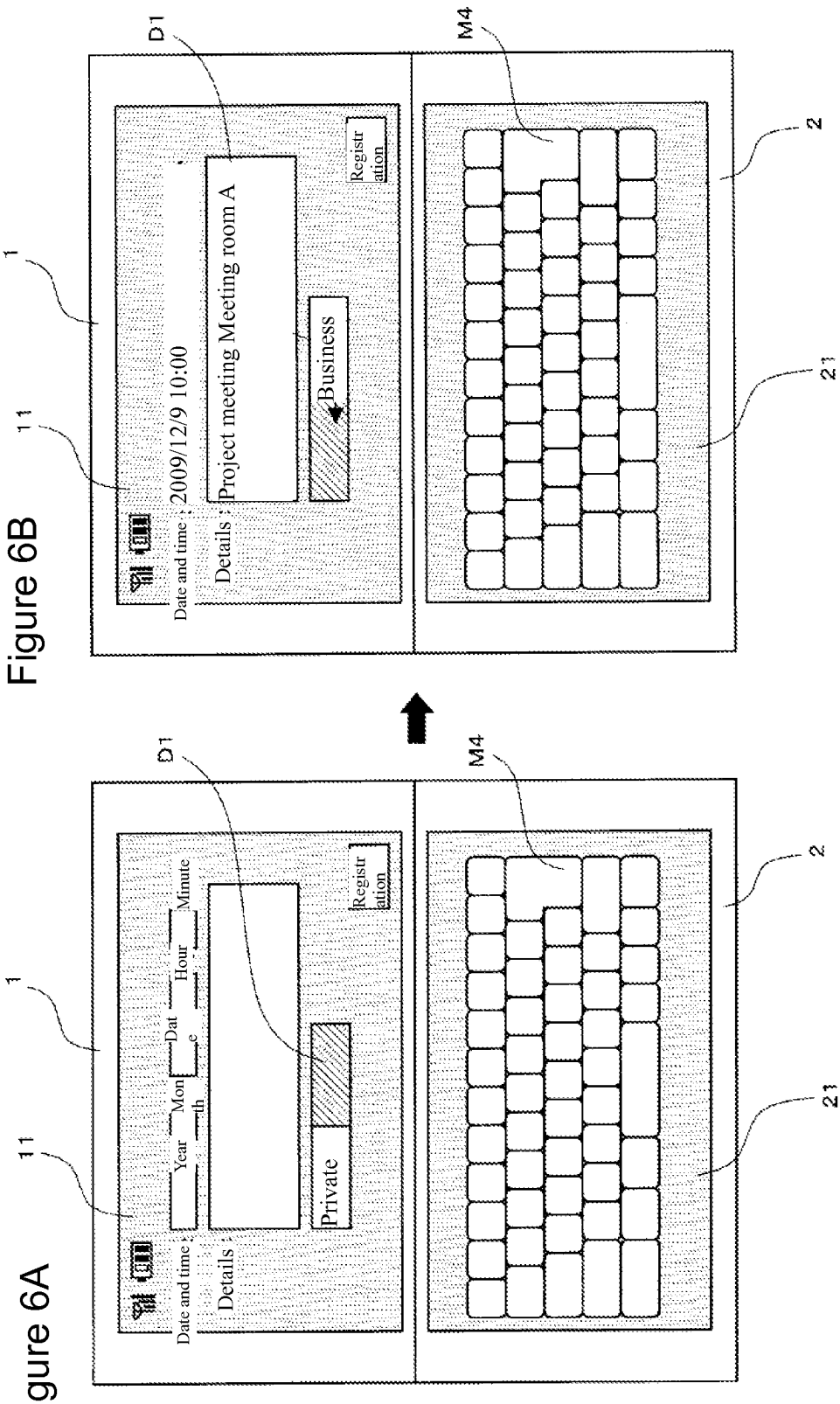

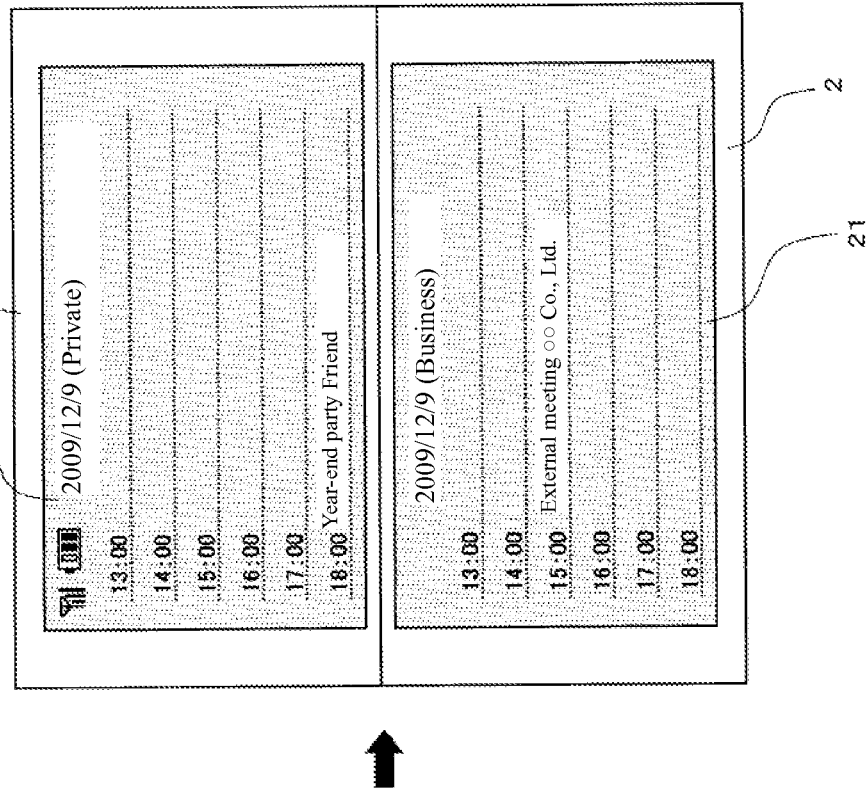
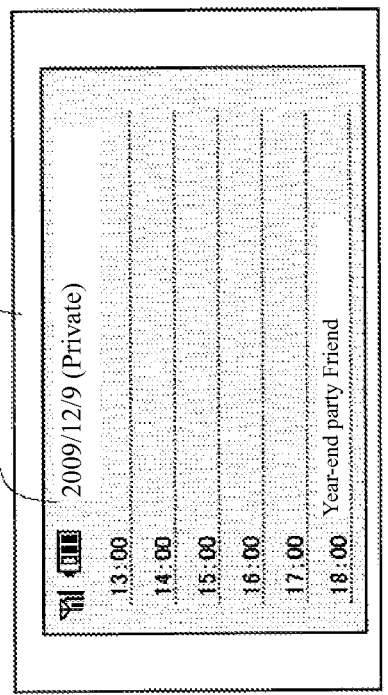
Figure 9B
Figure 9A

Figure 10B

| Group | Business |
|---|---|
| Position | Latitude xx Longitude yy |
| Day | Mon, Tue, Wed, Thu, Fri |
| Time | 8:00 to 17:00 |

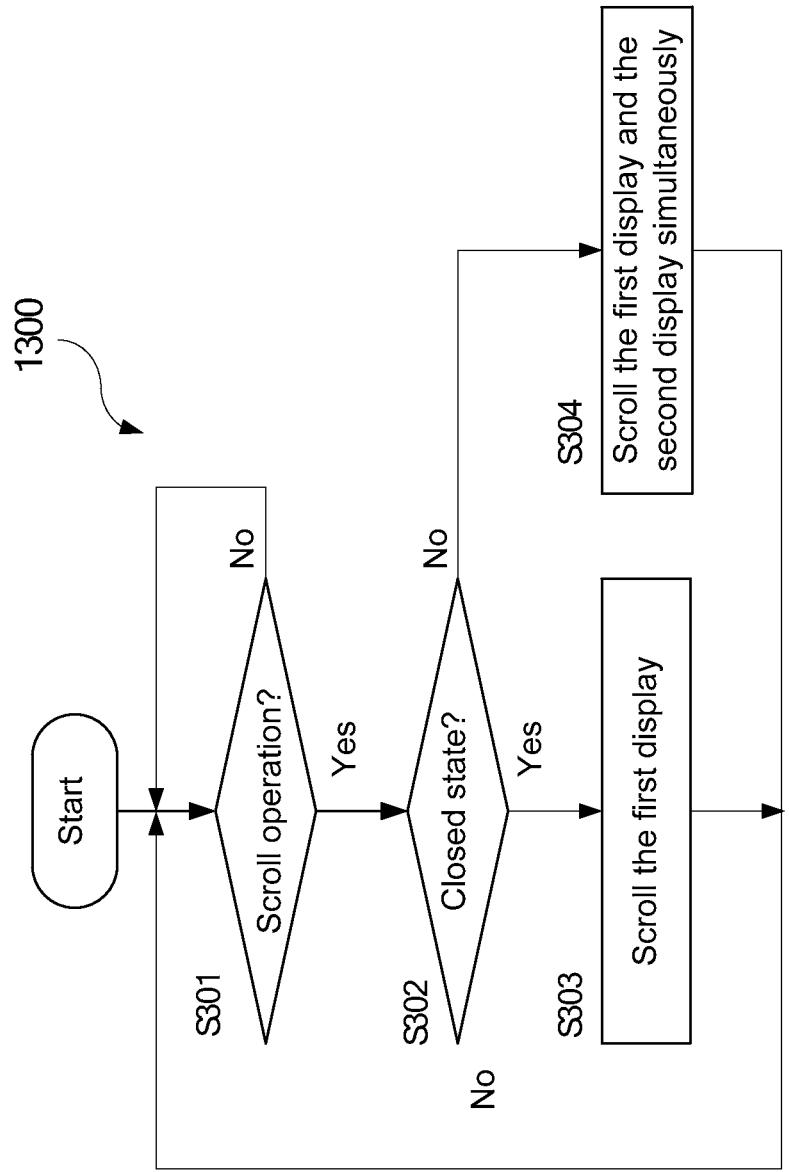

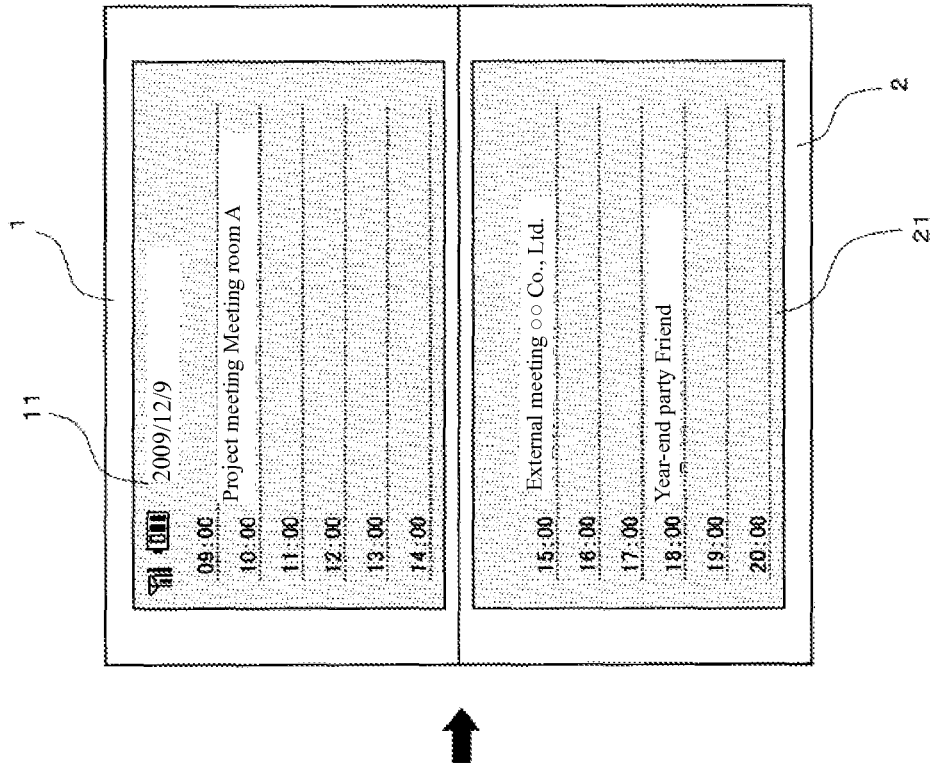
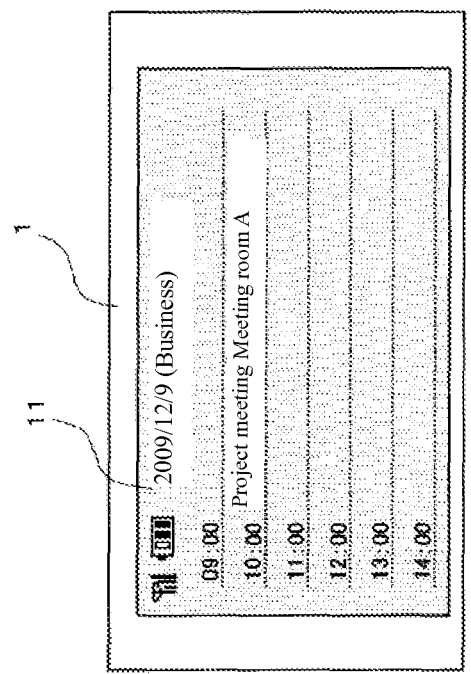
Figure 17A
Figure 17B

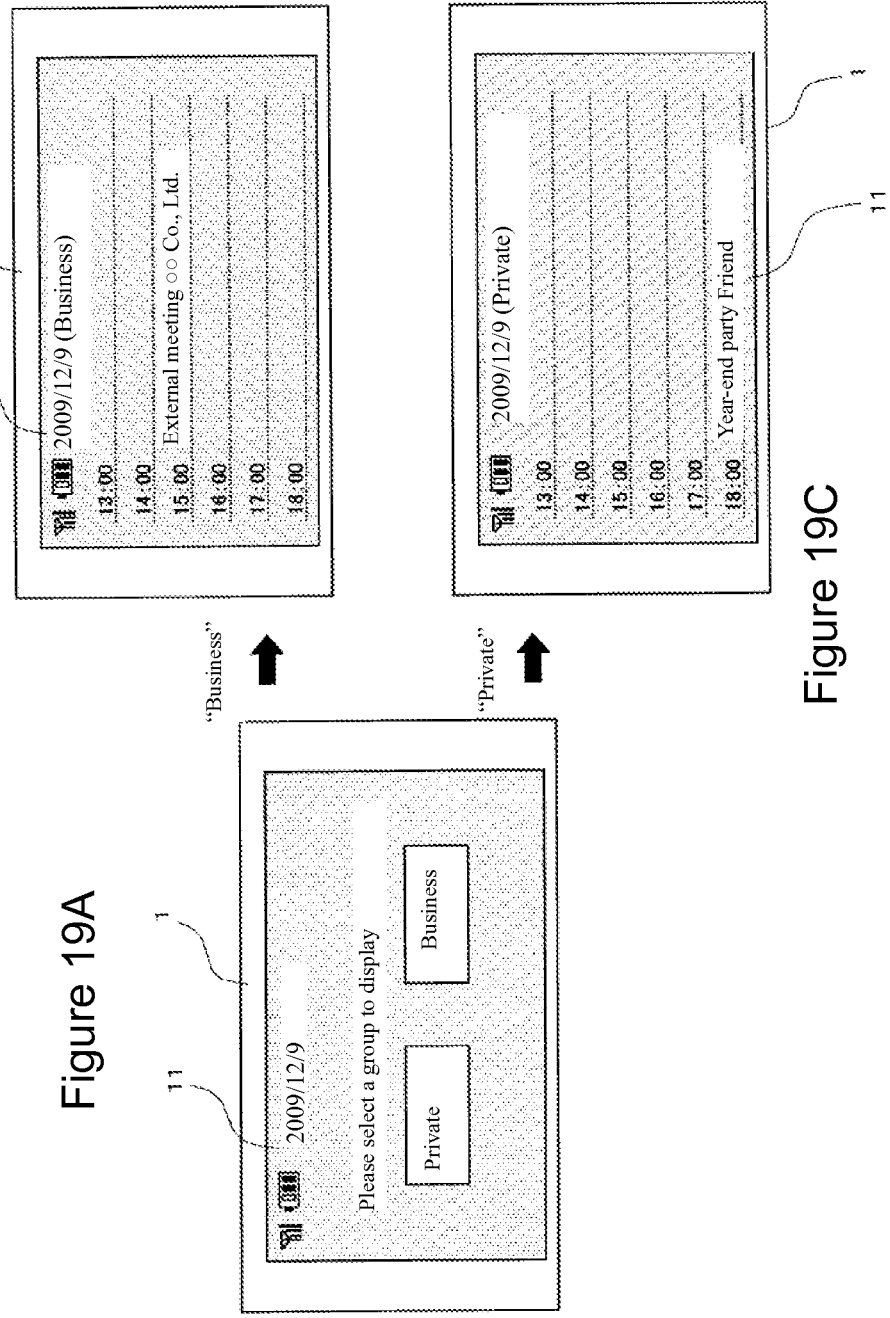

STATE BASED MOBILE PHONE WITH A FIRST DISPLAY MODULE AND A SECOND DISPLAY MODULE

CROSS-REFERENCE TO RELATED APPLICATION

The present application claims priority under 35 U.S.C. §119 to Japanese Patent Application No. 2009-293130, filed on Dec. 24, 2009, entitled "MOBILE TERMINAL DEVICE". The content of which is incorporated by reference herein in its entirety.

FIELD

Embodiments of the present disclosure relate generally to mobile devices, and more particularly relate to a mobile device operable to use as application to manage schedules, address books or the like.

BACKGROUND

Some mobile terminal devices comprise a scheduler application for managing a schedule or an address book application for managing phone numbers, e-mail addresses, physical addresses, and the like. A user can activate the scheduler to register schedule information and can confirm the schedule information subsequently.

SUMMARY

A method for operating a mobile terminal device comprising two displays is disclosure. Information of a first group is displayed on a first display module, if the first display module is externally exposed. Information of a second group that is different from the information of the first group is displayed on the first display module and a second display module, if both the first display module and the second display module are externally exposed.

In an embodiment, a mobile terminal device comprises a first display module and a second display module; a switching module operable to switch between a first state in which the first display module is externally exposed and a second state in which both the first display module and the second display module are externally exposed. The mobile terminal device further comprises a control module operable to provide display information of a first group to the first display module in the first state, and operable to provide display information of a second group that is different from the information of the first group to the first display module and the second display module in the second sate.

In yet another embodiment, a method for operating a mobile terminal device comprising at least two displays modules, displays information of a first group on a first display module, if a first display module is externally exposed. Information of a second group different from the information of the first group is displayed on the first display module and a second display module, if both the first display module and the second display module are externally exposed.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

FIG. 5B is an illustration of an exemplary table of schedule information in a schedule database according to an embodiment of the disclosure.

FIG. 6A illustrates a state before the schedule information is input according to an embodiment of the disclosure.

FIG. 6B illustrates a state after the schedule information is input according to an embodiment of the disclosure.

FIG. 9A is an illustration of an exemplary display screen of the mobile device in a close state according to an embodiment of the disclosure.

FIG. 9B is an illustration of an exemplary display screen of the mobile device in an open state according to an embodiment of the disclosure.

FIG. 10B is an illustration of an exemplary table of schedule information.

FIG. 13 is an illustration of an exemplary flow diagram showing a control process when a scroll operation is performed on the confirmation screen of the schedule information.

FIGS. 17A-B are illustrations of an exemplary display screen of the schedule information.

FIGS. 19A-C are illustrations of an exemplary display screen of the schedule information according to an embodiment of the disclosure.

DETAILED DESCRIPTION

Figure 1:
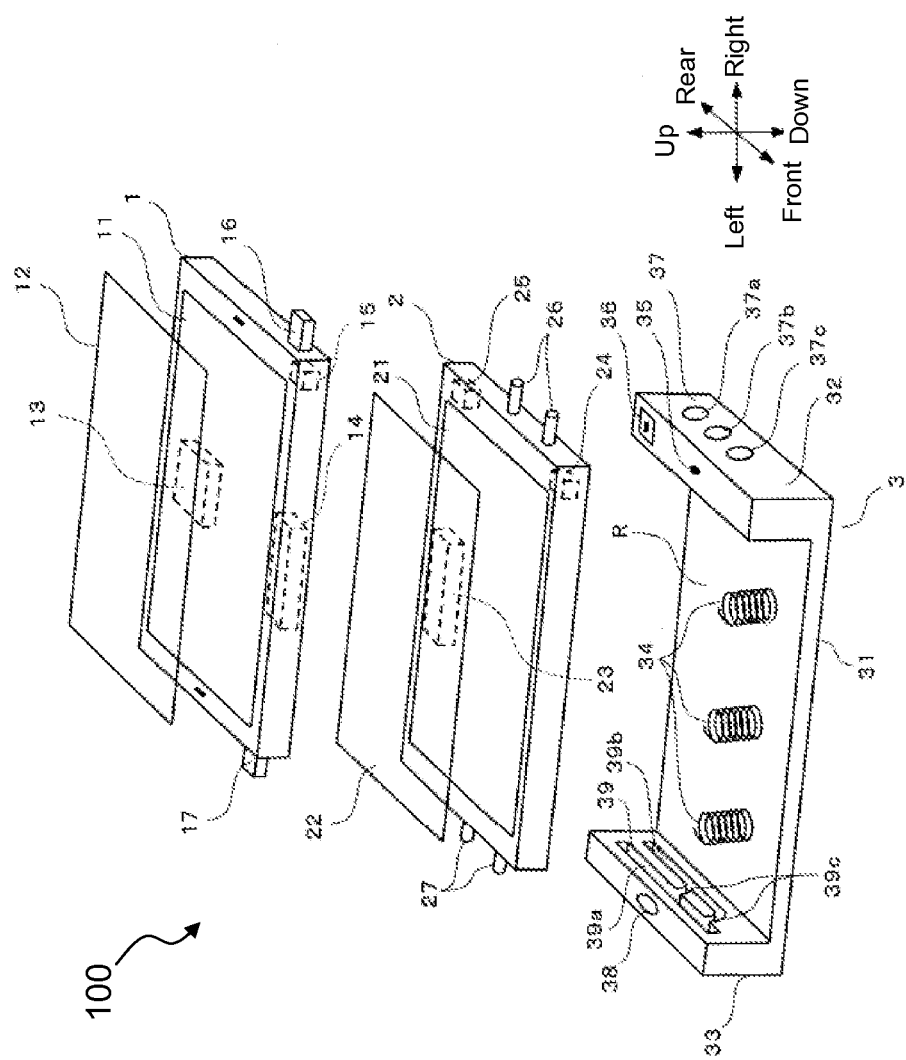
FIG. 1 is an illustration of an exemplary external view of a mobile phone according to an embodiment of the disclosure.

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding technical field, background, summary or the following detailed description. The present disclosure should be accorded scope consistent with the claims, and not limited to the examples described and shown herein.

Embodiments of the disclosure are described herein in the context of one practical non-limiting application, namely, an information-processing device such as a mobile phone. Embodiments of the disclosure, however, are not limited to such mobile phone, and the techniques described herein may be utilized in other applications. For example, embodiments may be applicable to digital books, digital cameras, electronic game machines, digital music players, personal digital assistance (PDA), ATM, personal handy phone system (PHS), lap top computers, TV's, GPS's or navigation systems, machining tools, pedometers, health equipments such as weight scales, display monitors and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

In a mobile terminal device comprising a scheduler application for managing a schedule or an address book application for managing phone numbers, e-mail addresses, physical addresses, and the like. A user can activate the scheduler to register schedule information and can confirm the schedule information subsequently. In the same manner, business-related address information and personal address information can be managed in the same address book, and the business-related address information and the personal address information displayed on the mobile terminal devices without distinction therebetween when the address information is confirmed. For example, if a schedule information of a same date is displayed on a same screen, the business-related information and the personal schedule information of the same date are displayed on the same screen without distinction therebetween.

The user may not want to show his/her personal schedule information to co-workers at work. Therefore, if the user wants to view the business-related schedule information while at work, it may be difficult to confirm a desired schedule information without distinction between different group of schedule information (e.g., personal, business). Similarly, the user may not want to show his/her business-related schedule information to family members and friends. Therefore, if the user wants to view the personal schedule information, it may be difficult to confirm the desired schedule information without distinction between different group of schedule information (i.e., personal, business).

FIG. 1 is an illustration of an exemplary external view of a mobile phone 100 according to an embodiment of the disclosure. The mobile phone 100 may comprise a first housing (cabinet) 1, a second housing (cabinet) 2, and a holding body 3 for holding the first housing 1 and the second housing 2.

The first housing 1 may have, for example but without limitation, a horizontally long rectangular parallelepiped shape, and the like. A first display 11 is located on the first housing 1 and display surface of the first display 11 thereof faces a front side of the first housing 1. The first display 11, as described below, may comprise a first liquid crystal panel 11$a$ and a first back light 11$b$ for illuminating the first liquid crystal panel 11$a$.

A first touch panel 12 is located on the front surface of the first display 11. The first touch panel 12 comprises a transparent sheet, and the display screen that is displayed on the first display 11 can be viewed through the first touch panel 12.

The first touch panel 12 may comprise a first transplant electrode and a second transparent electrode that are arranged in a matrix form. The first touch panel 12 detects a position on the display surface touched by a user by detecting a change in an electrostatic capacity between the transparent electrodes, and outputs a position signal that corresponds to the position.

The first housing 1 may comprise a camera module 13 that is located at a position slightly rear from the center thereof. A lens window (not shown) for capturing an object image in the camera module 13 is provided at a bottom surface of the first housing 1. The first housing 1 also comprises: a magnet 14 that is disposed at a middle position adjacent to the front surface; and a magnet 15 that is located at a right front corner portion. Furthermore, the first housing 1 comprises protruding portions 16 and 17 on a right side surface and a left side surface thereof, respectively.

The second housing 2 may, for example but without limitation, have a horizontally long rectangular parallelepiped shape, and the like. That is, the second housing 2 can have approximately the same shape and size as the first housing 1. The second housing 2 comprises a second display 21 on a surface thereof and the display surface of the second display 21 faces the front side of the second housing 2. The second display 21 comprises, as described below, a second liquid crystal panel 21$a$ and a second back light 21$b$ for illuminating the second liquid crystal panel 21$a$. Alternatively, the first display 11 and the second display 21 can comprise other display element such as an organic EL.

The second display 21 comprises a second touch panel 22 on the front surface thereof. The configuration of the second touch panel 22 is similar to that of the first touch panel 12.

The second housing 2 comprises a magnet 23 therein at a middle position adjacent to the rear surface thereof.

The magnet 14 in the first housing 1 and the magnet 23 in the second housing 2 are arranged such that, as described below, they are attracted to each other when the first housing 1 and the second housing 2 are positioned in the state in which they are in a position for constituting a large screen (open state). However, as for the first housing 1 and the second housing 2, if one magnet has sufficiently strong magnetic force, the other magnet may be replaced by a magnetic material.

The second housing 2 comprises a closing sensor 24 at a right front corner portion therein and an opening sensor 25 at a right rear corner portion therein. These sensors 24 and 25 comprise, for example but without limitation, a Hall IC circuit, and the like, and output a detection signal in response to a magnetic force of a magnet. As described below, when the first housing 1 and the second housing 2 reach an overlapping state, the magnet 15 of the first housing 1 approaches the closing sensor 24; hence, an ON signal is output from the closing sensor 24. On the other hand, when the first housing 1 and the second housing 2 reach a longitudinally aligned state, the magnet 15 of the first housing 1 approaches the opening sensor 25; hence, an ON signal is output from the opening sensor 25.

Furthermore, the second housing 2 further comprises two shaft portions 26 on the right side surface thereof and two shaft portions 27 on the left side surface thereof.

The holding body 3 comprises: a bottom plate member 31; a right holding member 32 that is formed at the right end portion of the bottom plate member 31; and a left holding member 33 that is formed at the left end portion of the bottom plate member 31. Within a housing region R that is surrounded by the bottom plate member 31, the right holding member 32, and the left holding member 33, the first housing 1 and the second housing 2 are housed in a vertically overlapping state.

The bottom plate member 31 comprises three coil springs 34 thereon so as to be aligned in a lateral direction. In the state in which the second housing 2 is attached on the holding body 3, the coil springs 34 abut on the bottom surface of the second housing 2 to impart the force for pushing up the second housing 2 in an upward direction.

The right holding portion 32 may comprise a microphone 35 and a power key 36 on an upper surface thereof. The right holding portion 32 may also comprise an operation key group 37 on an external surface thereof. The operation key group 37 comprises three operation keys, namely 37a, 37b, 37c, for example. These operation keys can operate certain functions, such as setting a manner mode without operating the touch panels 12 and 22. The left holding portion 33 comprises a speaker 38 on a top surface thereof. A user may hold the mobile phone such that the left holding portion 33 side reaches the user's ear and the right holding portion 32 side reaches the user's mouth, while the user is talking on the phone.

The right holding portion 32 and the left holding portion 33 comprise a guide groove 39 on internal surfaces thereon (right holding portion 32 is not shown). The guide groove 39 comprises an upper groove 39a and a lower groove 39b, which extend in a longitudinal direction, and two longitudinal grooves 39c, which extend vertically so as to be connected to the upper groove 39a and the lower groove 39b.

The mobile phone 100 can be assembled as follows: the shaft portions 26 and 27 are inserted into the lower groove 39b of the guide groove 39 in order to arrange the second housing 2 within the housing region R of the holding body 3; and the protruding portions 16 and 17 are inserted into the upper groove 39a of the guide groove 39 in order to arrange the first housing 1 within the housing region R of the holding body 3 and on the second housing 2.

In this manner, the first housing 1 turns slidable longitudinally by being guided by the upper groove 39a. The second housing 2 turns slidable longitudinally while being guided by the lower groove 39b. Once the second housing 2 moves forward and the shaft portions 26 and 27 reach the longitudinal groove 39c, the second housing 2 turns slidable vertically while being guided by the longitudinal groove 39c.

FIGS. 2A to 2D are illustrations of the mobile phone 100 shown in FIG. 1 to show an operation for switching the second housing from an open state to a closed state according to an embodiment of the disclosure.

Figure 2A:
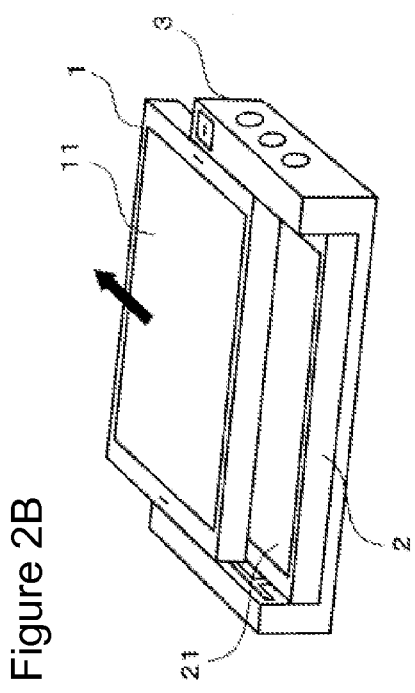
FIGS. 2A to 2D are illustrations of the mobile phone shown in FIG. 1 to show an operation for switching the second housing from an open state to a closed state according to an embodiment of the disclosure.
Figure 2B:
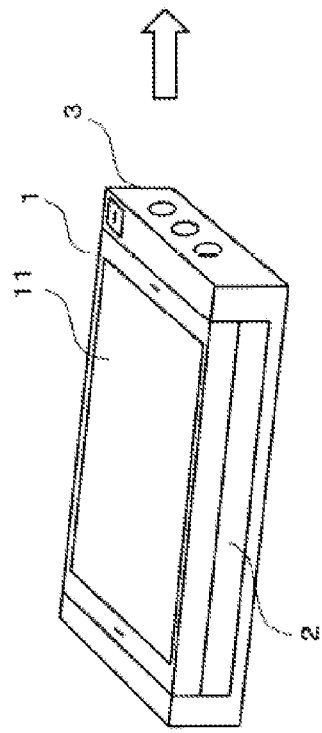

In an embodiment, the second housing 2 is behind the first housing 1 (FIG. 2A) in an initial state (closed state). In the closed state, only the first display 11 is externally exposed. The switching operation can be carried out manually by a user as follows:

First, the user moves the first housing 1 rearward in a direction of arrow shown on the first display 11, in FIG. 2B. Next, once the first housing 1 moves substantially completely rearward, the second housing 2 can be slid forward in a direction of the arrow shown on the second display 21 in FIG. 2C. Once the second housing 2 moves to a position in which it is not completely overlapping with the first housing 1, that is, a position in which it is aligned in front of the first housing 1 by the sliding operation, the shaft portions 26 and 27 reach the longitudinal groove 39c; hence, the second housing 2 is pushed by the coil spring 33 and lifted upward (direction of the arrow A3) with an upward attraction force between the magnet 14 and the magnet 23.

Once the second housing 2 is in a substantially completely opened state (open state), the first housing 1 and the second housing 2 are aligned so as to firmly contact longitudinally and to make a flat plane with each other (FIG. 2D) into a large screen state in which the first display 11 and the second display 21 are both externally exposed and the two screens are integrated with each other.

Figure 3:
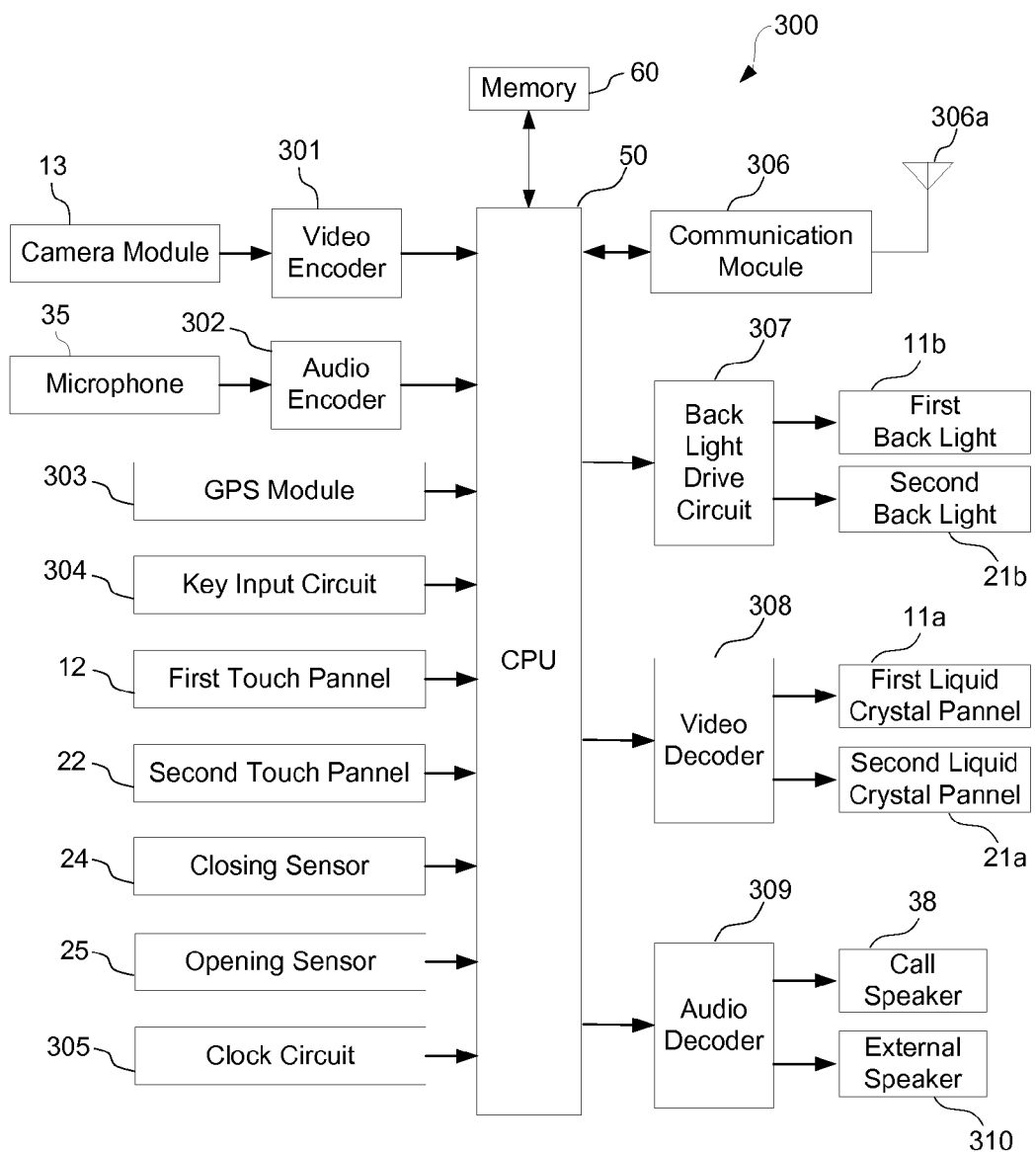
FIG. 3 is an illustration of a schematic functional block diagram of the mobile phone according to an embodiment of the disclosure.

FIG. 3 is an illustration of a schematic functional block diagram of the mobile phone 300 according to an embodiment of the disclosure. The mobile phone 300 comprises a CPU 50 (control module), a memory module 60, a video encoder 301, an audio encoder 302, a GPS module 303 (position acquisition module), a key input circuit 304, a clock circuit 305 (timing module), a communication module 306, a back light drive circuit 307, a video decoder 308, an audio decoder 309, an external speaker 310, the camera module 13, and the microphone 35.

The camera module 13 comprises an imaging element such as a CCD. The camera module 13 digitizes an imaging signal that is output from an imaging element, applies various corrections such as a gamma correction to the imaging signal, and outputs it to the video encoder 301. The video encoder 301 applies an encoding process to an imaging signal from the camera module 13 and outputs it to the CPU 50.

The microphone 35 converts collected voice into a voice signal and outputs it to the audio encoder 302. The audio encoder 302 converts an analog voice signal from the microphone 35 into a digital voice signal, applies the encoding process to the digital voice signal, and outputs it to the CPU 50.

The GPS module 303 measures a geographical current position, such as longitude and latitude, based on a signal from a plurality of GPS satellites in the sky, and outputs the position information (GPS information) to the CPU 50. Once the GPS module 303 acquires position information, the CPU 50 (control module) registers the position information by correlating the position information with a group. While in the first state, the CPU 50 causes the first display module 11 to display information of the group that is compatible with a current position, as information of a first group.

When the power key 36 or any of keys of the operation key group 37 are operated, the key input circuit 304 outputs an input signal that corresponds to each of the keys to the CPU 50.

The clock circuit 305 measures a current time and outputs same to the CPU 50. The CPU 50 ascertains a time and date based on the current. The CPU 50 then registers the current time by correlating the current time and the group. While in the first state, the control module 100 then causes the first display module 11 to display information of the group that is compatible with a the current time, as information of the first group.

The communication module 306 converts transmission data, such as a voice signal, image signal, and a text signal from the CPU 50, into a radio signal and transmits it to a base station via an antenna 306a. Additionally, the radio signal that is received via the antenna 306a is converted into received data, such as a voice signal, image signal, and a text signal, and is output to the CPU 50.

The back light drive circuit 307 supplies a voltage signal that corresponds to a control signal from the CPU 50 to the first back light 11b and the second back light 21b. The first back light 11b is turned on by the voltage signal from the back light drive circuit 307 and illuminates the first liquid crystal panel 11a. The second back light 21b is turned on by the voltage signal from the back light drive circuit 307 and illuminates the second liquid crystal panel 21a.

Figure 2C:
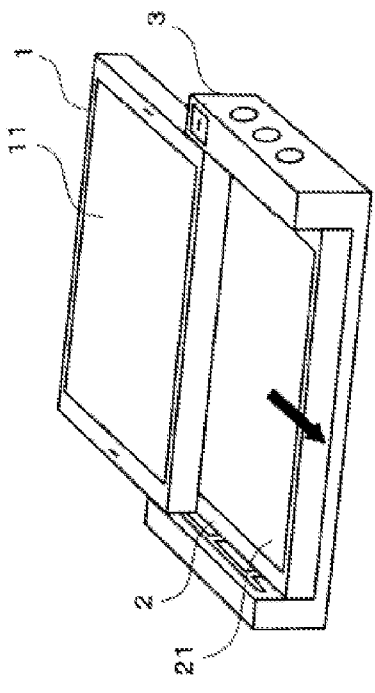
Figure 2D:
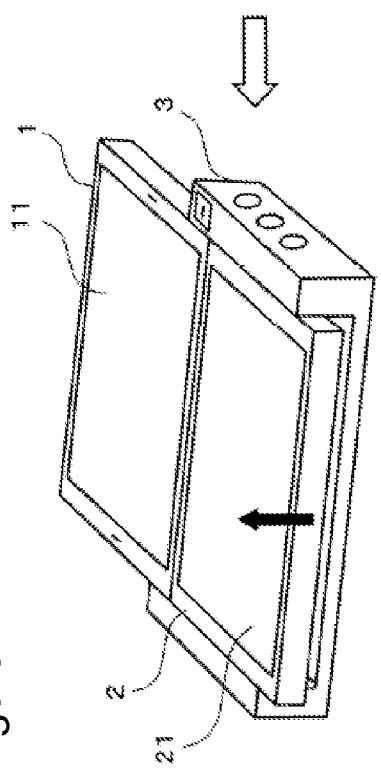

However, the second back light 21b may be turned on when the panel begins to be opened from the closed state, when it becomes the opened state, or before being the opened state (e.g., in the state shown in FIG. 2C).

The video decoder 308 converts a video signal from the CPU 50 into an analog or digital video signal, which can be displayed on the first liquid crystal panel 11a and the second liquid crystal panel 21a, and outputs it to the liquid crystal panels 11a and 21a. The first liquid crystal panel 11a and the second liquid crystal panel 21a display an image (display screen) on each display surface in response to the video signal.

The audio decoder 309 applies a decoding process to a digital voice signal from the CPU 50, converts the voice signal into an analog voice signal, and outputs the analog voice signal to the call speaker 38. Additionally, the audio decoder 309 applies the decoding process to digital tone signals of a variety of notification tones such as an incoming call tone and an alarm tone from the CPU 50, converts the digital tone signals into analog tone signals, and outputs at least one of the analog tone signals to the external speaker 310. The call speaker 38 reproduces a voice signal from the audio decoder 309 as a voice. The external speaker 310 reproduces an incoming call tone, etc., from the audio decoder 309.

The memory module 60 may comprise, for example but without limitation, a random access storage device such as a random access memory (RAM), a non-volatile storage device (non-volatile semiconductor memory, hard disk device, optical disk device, and the like), HDD, or any other form of storage medium known in the art. Various function of the CPU 50 is realized by executing various programs in the memory module 60. The memory module 60 may store, for example but without limitation, image data taken by the camera module 13, other image data, text data, mail data, a schedule database (FIG. 5B), and the like.

The CPU 50 operates the camera module 13, the microphone 35, the communication module 306, the liquid crystal panels 11a and 21a, the talk speaker 38, the external speaker 310, etc., based on an operation input signal from the key input circuit 304 and the touch panels 12 and 22 according to a control program. In this manner, a variety of functions (applications) such as a talk function, an e-mail function, etc., are executed.

Additionally, the CPU 50 creates a display screen that is displayed on each display 11 and 21 within a work area that is prepared in the memory module 60 and outputs a video signal for constituting the display screen.

Figure 4:
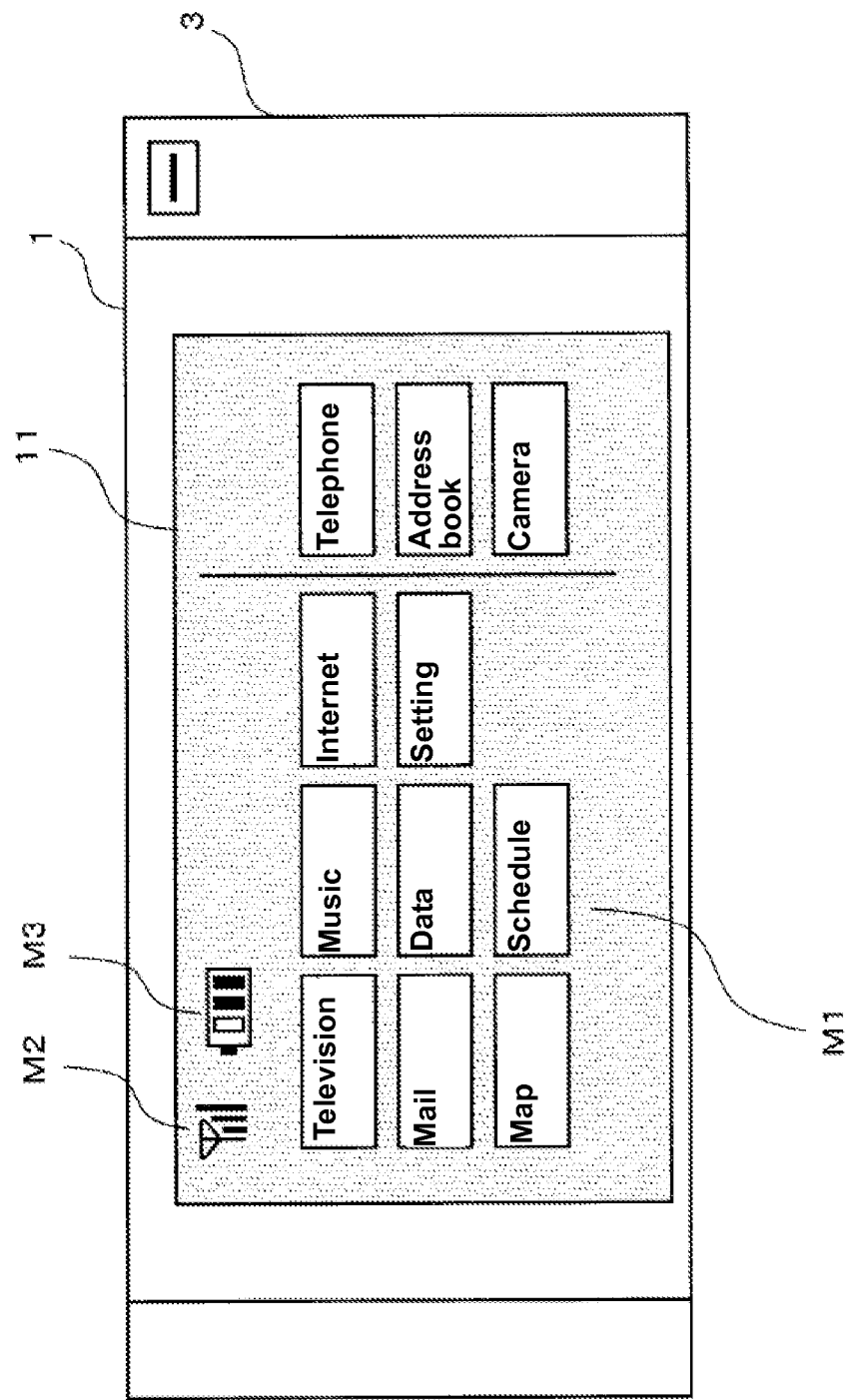
FIG. 4 is an illustration of an exemplary display screen displaying an initial screen on a first display of a mobile phone in a close state of the second housing according to an embodiment of the disclosure.

FIG. 4 is an illustration of an exemplary display screen displaying an initial screen on a first display 11 of the mobile phone 300 in a close state of the second housing 2 according to an embodiment of the disclosure. In the state in which the second housing 2 is closed, for example, a menu screen is displayed as an initial screen on the first display 11. On the menu screen, for example, as shown in FIG. 4, icons M1 for executing previously registered applications are displayed. In addition to the previously registered applications, for example, other applications are available by downloading same through the Internet, and other sources. These other applications may be added to the mobile phone by an installation. The user can execute a desired application by touching at least one of the icons M1.

An antenna mark M2 for showing a reception, and a mark M3 for showing remaining amount of a battery are further displayed on the first display 11. The user can confirm a reception state based on the antenna mark M2 and can confirm remaining amount of the battery based on the remaining amount mark M3.

In the abovementioned initial screen, when the icon M1 for "Schedule" is touched by the user, a scheduler is initiated and a function for schedule management is executed. The user can register the desired schedule information on a schedule registration screen and confirm the registered schedule information on a confirmation screen.

Figure 5A:
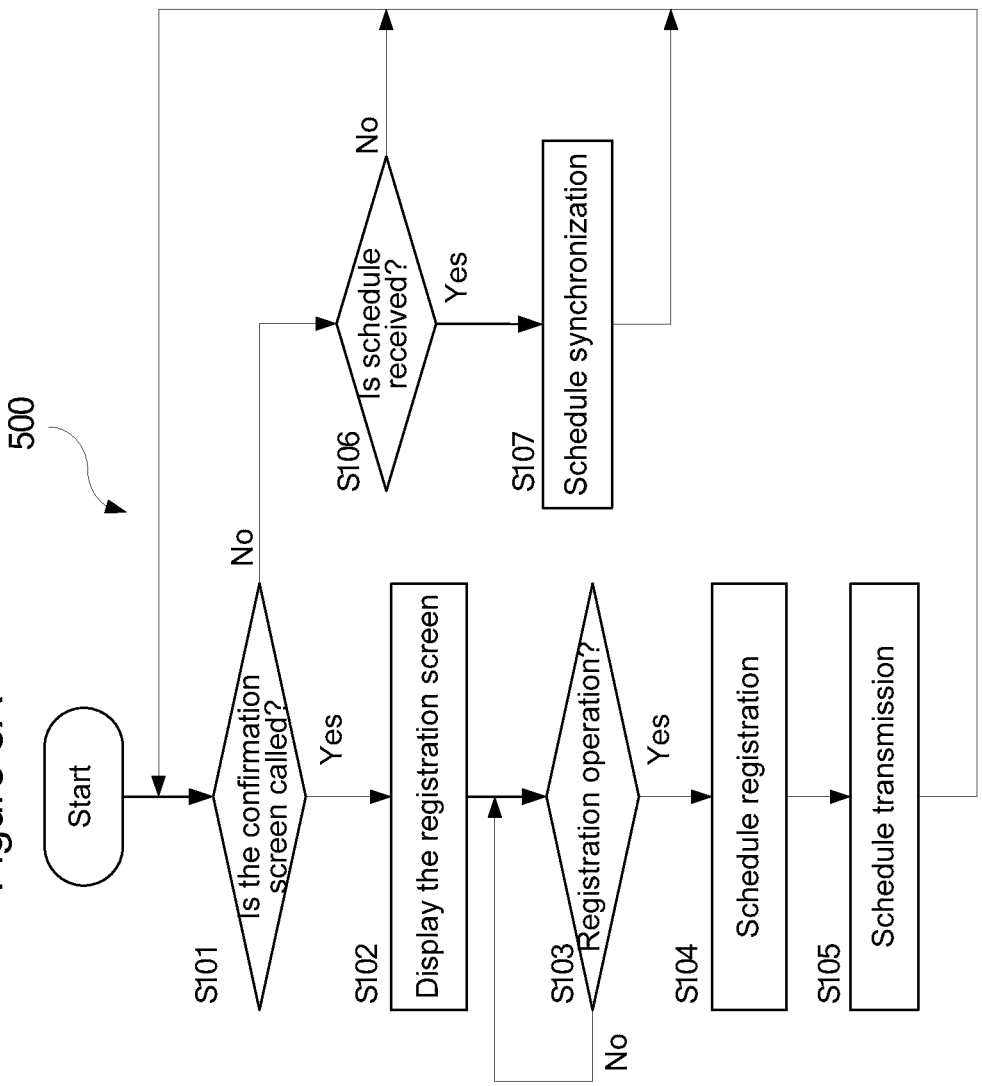
FIG. 5A is an illustration of an exemplary flow diagram showing a schedule registration process according to an embodiment of the disclosure.

FIG. 5A is an illustration of an exemplary flowchart 500 showing a schedule registration process according to an embodiment of the disclosure. FIG. 5B is an illustration of an exemplary table of schedule information in a schedule database according to an embodiment of the disclosure. FIG. 5B shows a database related to the schedule information to be registered (hereinafter referred to as "schedule database").

FIGS. 6A-6B are shows examples of the registration screens of the schedule information according to an embodiment of the disclosure. FIG. 6A shows a state before the schedule information is input, and FIG. 6B shows a state after the schedule information is input.

The various tasks performed in connection with the process 500 may be performed mechanically, by software, hardware, firmware, or any combination thereof. It should be appreciated that the process 500 may include any number of additional or alternative tasks, the tasks shown in FIG. 5A need not be performed in the illustrated order, and the process 500 may be incorporated into a more comprehensive procedure or process having additional functionality not described in detail herein.

For illustrative purposes, the following description of the process 500 may refer to elements mentioned above in connection with FIGS. 1-4. The process 500 is further described herein especially with reference now to FIGS. 5B and 6A-6B. In practical embodiments, portions of the process 500 may be performed by different elements of the systems 100 and 300 such as: the CPU 50, the memory module 60, the video encoder 301, the audio encoder 302, the GPS module 303, the key input circuit 304, the clock circuit 305, the communication module 306, the back light drive circuit 307, the video decoder 308, the audio decoder 309, the external speaker 310, the first display 11, the second display 21, etc. The process 500 may have functions, material, and structures that are similar to the embodiments shown in FIGS. 1-4. Therefore common features, functions, and elements may not be redundantly described here.

The CPU 50 determines whether or not an operation for calling the registration screen of the schedule information is performed by the user (inquiry task S101). The user can perform a calling operation of the registration screen on the initial screen of a schedule management function.

Once the calling operation of the registration screen is performed by the user (YES branch of inquiry task S101), the CPU 50 causes the first display 11 and the second display 21 to display the registration screen (task S102). That is, as shown in FIG. 6A, the CPU 50 causes the first display 11 to display a date and time, details, and a pattern for selecting a group ("private", "business"). Additionally, the CPU 50 causes the second display 21 to display a QWERTY key M4 for inputting letters or numbers.

As shown in FIG. 6B, the user inputs the date and time, and the details using the QWERTY key M4. Furthermore, the user selects a group of the input schedule information. For example, when a group for "Business" is selected, the user opens a window portion of the group for "Business" and covers a group for "Private" with the window portion by dragging and sliding the window portion, which is shown by slanted lines in FIG. 6, from right to left. In this way, once the user inputs the date, the time, and the details, and the selection of the group are completed, the user presses the registration key.

Once the registration operation is performed by the user (YES branch of inquiry task S103), the CPU 50 registers the input schedule information (task S102) in a schedule database. During the process, as shown in FIG. 5B, an identification flag of the schedule database is set based on the type of the schedule information. That is, a business flag is set for the business-related schedule information, and a personal flag is set for the personal schedule information.

The CPU 50 sends the registered schedule information via the communication module 306 to a personal computer at an office or at home on which the synchronization setting of the schedule information with the mobile phone 100 is performed (task S105). The CPU 50 sends the business-related schedule information in the schedule database to the personal computer at the office if the schedule information registered is related to business, or sends the private schedule information in the schedule database to a personal computer at home if the schedule information is related to private matters. In this manner, the personal computer at the office or at home executes a synchronization process of the schedule information, and the schedule database in a memory of the personal computer is rewritten such that the schedule information is synchronized with the schedule information in the mobile phone 100.

If the calling operation of the registration screen is not performed (NO branch of inquiry task S101), the CPU 50 determines whether or not the communication module 306 receives the schedule information from the personal computer at the office or at home on which the synchronization setting is performed (inquiry task S106).

Once new schedule information is registered in the personal computer at the office or at home, the schedule information in the schedule database is sent. In this manner, once the CPU 50 determines that the schedule information is received (YES branch of inquiry task S106), the CPU 50 executes a synchronization process of the schedule information (task S107).

That is, the CPU 50 determines whether a sender of the schedule information is a personal computer at the office or a personal computer at home. When the synchronization setting is performed, in the memory module 60, identification information for identifying the personal computer on which the synchronization setting is performed is stored. The identification information of the computer is added to the schedule information, and the CPU 50 determines a personal computer of the sender based on the identification information.

When the CPU 50 determines that the sender is the personal computer at the office, the CPU 50 compares the sent schedule information with the business-related schedule information in the schedule database in the memory module 60 and registers the schedule information that is not registered in the schedule database. During this process, the business-related flag is set to the schedule information. On the other hand, when the CPU 50 determines that the sender is the personal computer at home, it compares the sent schedule information with the personal schedule information in the schedule database in the memory module 60 and registers the schedule information that is registered in the schedule database. During this process, the personal flag is set to the schedule information.

As described above, registration of the schedule information is executed by the input operation using the registration screen or by the transmission from the personal computer at the office or at home.

However, a transmission process from the mobile phone 100 may be executed using a proximity communication when the proximity communication with a personal computer is available, and it may not be sent in real time. Additionally, with regard to a reception process of the mobile phone 100, it may be executed at a predetermined timing when the proximity communication is available.

Figure 7:
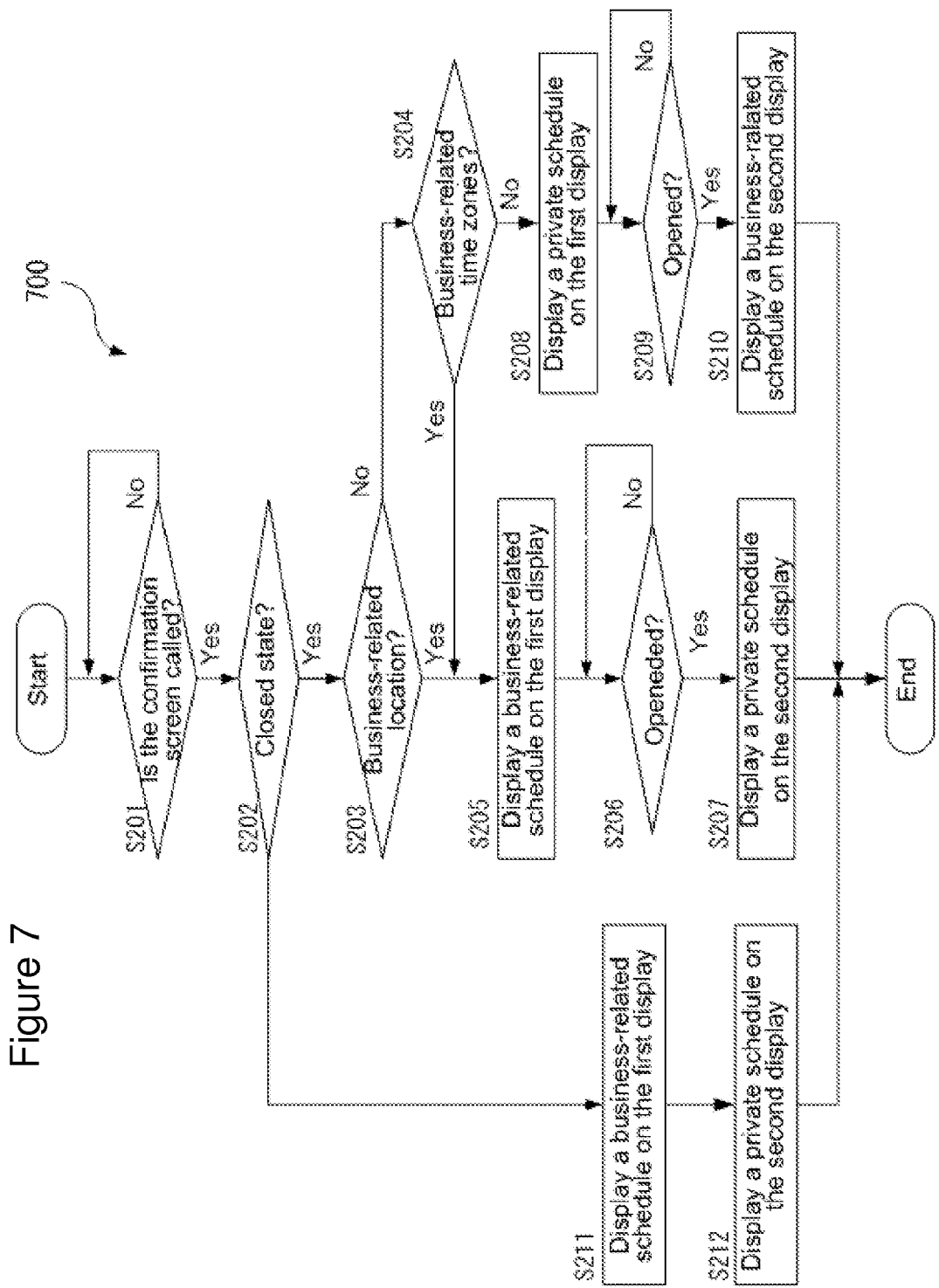
FIG. 7 is an illustration of an exemplary flow diagram showing a process for displaying the schedule information according to an embodiment of the disclosure.

FIG. 7 is an illustration of an exemplary flowchart 700 showing a control process 700 for displaying the schedule information according to an embodiment of the disclosure. Additionally, FIG. 8 and FIG. 9 are diagrams showing a display example of the confirmation screen of the schedule information. FIG. 10 is a diagram for describing an operation for registering a condition for a location and time used for determining a group that is displayed on the first display, in the state in which the second housing is closed.

The various tasks performed in connection with the process 700 may be performed mechanically, by software, hardware, firmware, or any combination thereof. It should be appreciated that the process 700 may include any number of additional or alternative tasks, the tasks shown in FIG. 7 need not be performed in the illustrated order, and the process 700 may be incorporated into a more comprehensive procedure or process having additional functionality not described in detail herein.

For illustrative purposes, the following description of the process 700 may refer to elements mentioned above in connection with FIGS. 1-4. The process 700 is further described herein especially with reference now to FIGS. 8-10. In practical embodiments, portions of the process 700 may be performed by different elements of the systems 100 and 300 such as: the CPU 50, the memory module 60, the video encoder 301, the audio encoder 302, the GPS module 303, the key input circuit 304, the clock circuit 305, the communication module 306, the back light drive circuit 307, the video decoder 308, the audio decoder 309, the external speaker 310, the first display 11, the second display 21, etc. The process 700 may have functions, material, and structures that are similar to the embodiments shown in FIGS. 1-4. Therefore common features, functions, and elements may not be redundantly described here.

The CPU 50 determines whether or not an operation for calling the confirmation screen of the schedule information is performed by a user (inquiry task S201). The user can perform a calling operation of the confirmation screen on the initial screen of a schedule management function. Then, the user performs an operation for specifying a date of the schedule information that the user wants to confirm along with the calling operation.

Once the calling operation of the confirmation screen is performed by the user (YES branch of inquiry task S201), the CPU 50 determines whether or not the second housing 2 is in the closed state (inquiry task S202). If the second housing 2 is in the closed state (YES branch of inquiry task S202), whether or not the location at which the position information is acquired currently is a business-related location is determined based on the position information from the GPS module (inquiry task S203). The CPU 50 further determines whether or not the current time is in a business-related time zone (inquiry task 204).

Figure 10A:
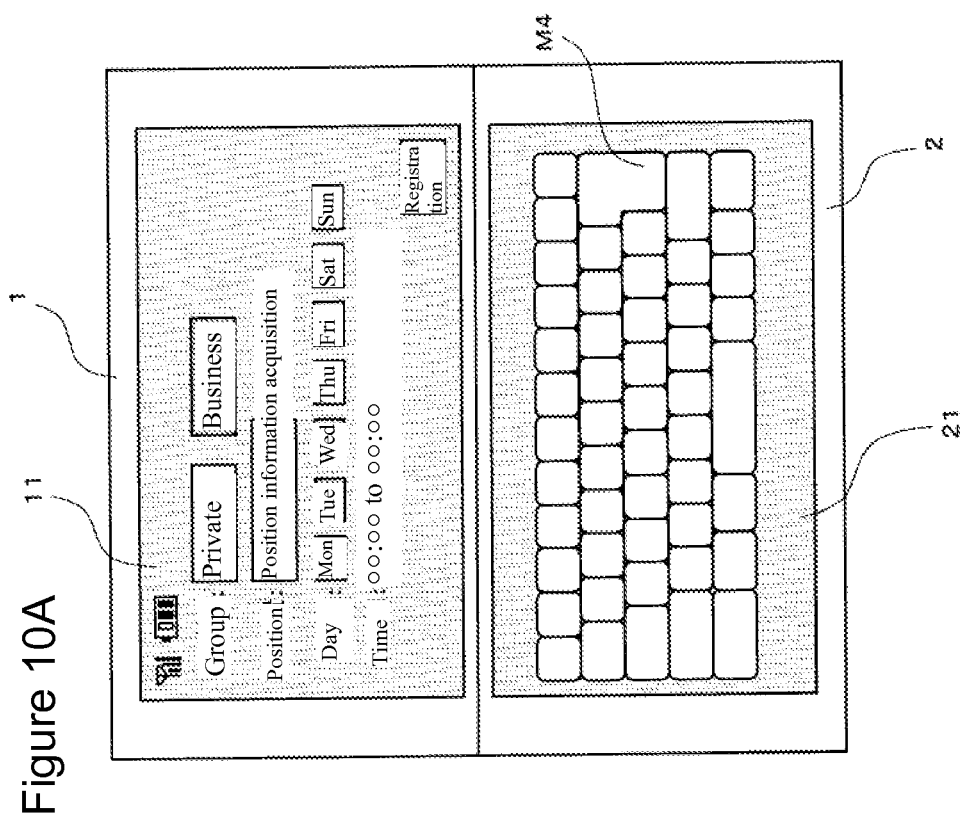
FIG. 10A is an illustration of an exemplary display screen showing an operation for registering conditions according to an embodiment of the disclosure.

The user, for example, previously registers the position information of a business-related location and a business-related time zone using a condition registration screen shown in FIG. 10A. When the user's office and the working hours are registered, the user calls the condition registration screen at the office. Subsequently, in an item, namely "Group", the user selects "Business" group as a group to be registered from the two groups, namely "Business" and "Private". Next, the user presses the "Position information acquisition" key in the item, namely "Position", to acquire the position information of the office from the GPS module 303. Furthermore, the user selects the working day in the item, namely "Day", and inputs a working time zone in the item, namely "Time". Once the input is completed, the user presses the registration key. In this way, as shown in FIG. 10B, information that is input in the condition registration screen is registered in a database in the memory module 60. However, preferably, the plurality of position information and the time zones can be registered in the database.

The CPU 50 determines that it is a business-related location as long as the currently acquired position information (position information at that location) is the location within a predetermined range relative to the registered position information. Additionally, the CPU 50 determines that it is in a business-related time zone as long as the current time is a registered day and falls within in the working time zone.

The CPU 50 causes the first display 11 to display the business-related schedule information (task S205) because the schedule information is likely to be confirmed while working, as long as the current location is at the business-related location (YES branch of inquiry task S203), or as long as the current time is in the business-related time zone (YES branch of inquiry task S204). Accordingly, the user can confirm a business-related schedule.

Figure 8A:
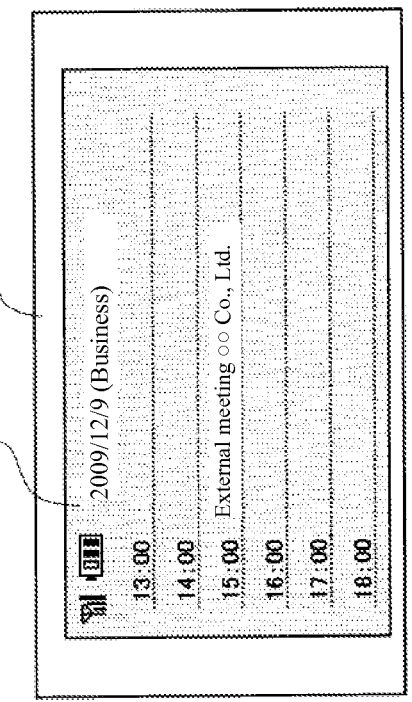
FIG. 8A is an illustration of an exemplary display screen of the mobile device in a close state according to an embodiment of the disclosure.

The CPU 50 reads the schedule information on which the business-related flag is set from the schedule database and causes the first display 11 to display it. Based on this, on the first display 11, for example, as shown in FIG. 8A, details of the business-related schedule is displayed at each time on a date that is specified by the user.

In this way, the user can confirm the business-related schedule information by viewing the first display 11.

The CPU 50 determines whether or not the second housing 2 is opened (inquiry task S206). That is, when the user who is viewing a business-related schedule wants to confirm the personal schedule information, the user opens the second housing 2.

Once the second housing 2 is opened (YES branch of inquiry task S206), the CPU 50 causes the second display 21 to display the personal schedule information while maintaining the display state of the first display 11 (task S207).

Figure 8B:
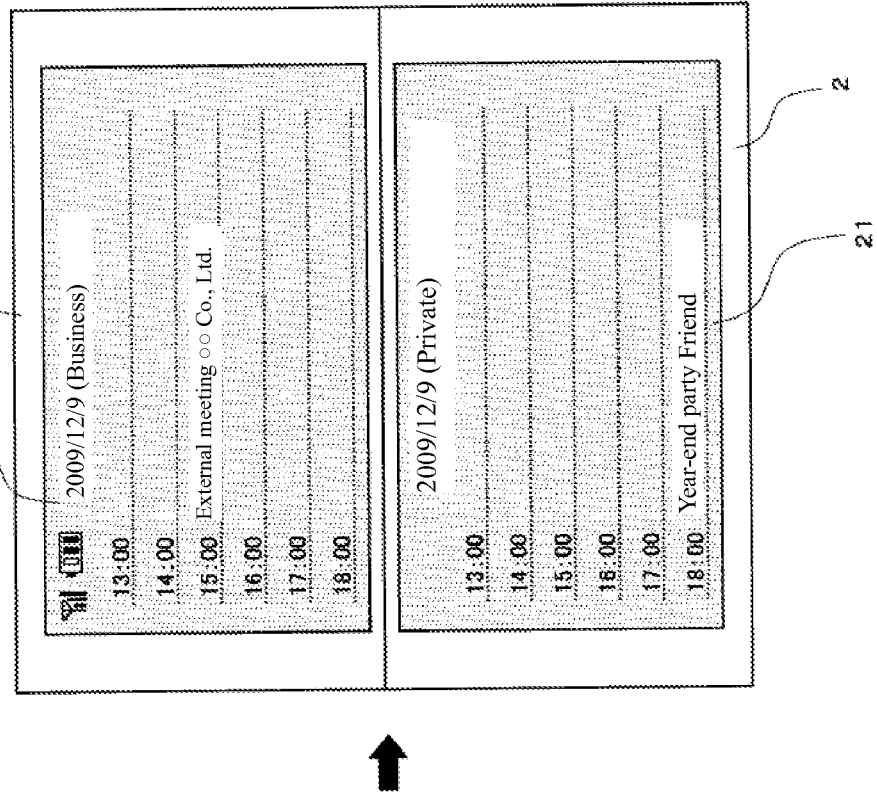
FIG. 8B is an illustration of an exemplary display screen of the mobile device in an open state according to an embodiment of the disclosure.

That is, the CPU 50 reads the schedule information on which the personal flag is set from the schedule database and causes the second display 21 to display it. Based on this, on the second display 21, as shown in FIG. 8B, the details of the personal schedule is displayed for each time on a date that is specified by the user, for example.

In this way, the user can confirm the business-related schedule information by viewing the first display 11 and can confirm the personal schedule information by viewing the second display 21.

On the other hand, as long as it is determined that the current location is not at the business-related location at step S203 (NO branch of inquiry task S203) and that the current time is not in the business-related time zone (NO branch of inquiry task S204) the CPU 50 causes the first display 11 to display the personal schedule information (task S208), because the schedule information is likely to be confirmed during a private time.

The CPU 50 reads the schedule information on which the personal flag is set from the schedule database and causes the first display 11 to display it. Based on this, on the first display 11, the details of the personal schedule are displayed at each time on a date that is specified by the user, for example (FIG. 9A).

In this way, the user can confirm only the personal schedule information by viewing the first display 11.

Next, the CPU 50 determines whether or not the second housing 2 is opened (inquiry task S209). That is, when the user who is viewing the personal schedule information wants to confirm a business-related schedule, the user opens the second housing 2.

Once the second housing 2 is opened (YES branch of inquiry task S209), the CPU 50 causes the second display 21 to display the business-related schedule information while maintaining the display state of the first display 11 (task S210).

The CPU 50 reads schedule information on which the business-related flag is set from the schedule database and causes the second display 21 to display it. Based on this, on the second display 21, for example, the details of the business-related schedule are displayed at each time on a date that is specified by the user (FIG. 9B).

In this way, the user can confirm the personal schedule information by viewing the first display 11 and can confirm the business-related schedule information by viewing the second display 21.

There is the case in which the user performs the calling operation of the schedule confirmation screen, in the state in which the second housing 2 is opened. If the second housing 2 is opened (NO branch of inquiry task S202) when the calling operation of the confirmation screen is performed (YES branch of inquiry task S101), the CPU 50 causes the first display 11 to display business-related schedule information (task S211) and causes the second display 21 to display the personal schedule information (task S212) regardless of the current location and the time zone.

In this case, the personal schedule information may be displayed on the first display 11 and the business-related schedule information may be displayed on the second display 21. Additionally, similar determination as the inquiry task S203 and/or the inquiry task S204 is performed, and if it is a business-related location and a time zone, the business-related schedule information may be displayed on both displays 11 and 21, and if it is a private location and a time zone, the personal schedule information may be displayed on both displays 11 and 21. In this case, twice the number of the schedule information at the time of one display can be displayed.

Although, in the abovementioned configuration, both the location and the time are determined, only the location may be determined as explained on the context of discussion of process 1100.

Figure 11:
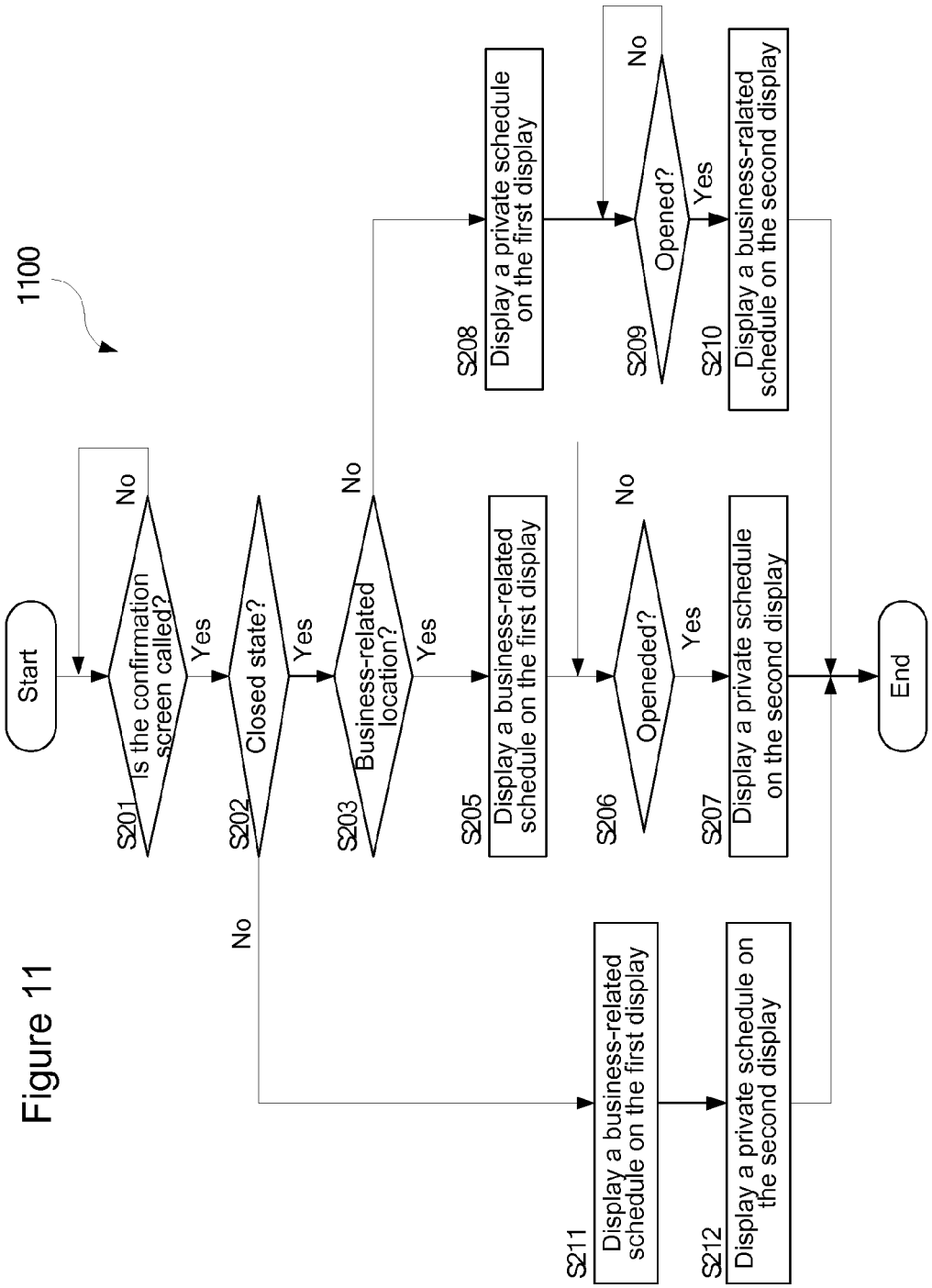
FIG. 11 is an illustration of an exemplary flow diagram showing a control process for displaying the schedule information according to an embodiment of the disclosure.

FIG. 11 is an illustration of an exemplary flow diagram showing a process 1100 for displaying the schedule information according to an embodiment of the disclosure. Process 1100 determines the location as compared to the process 1000 where both the location and the time are determined. The various tasks performed in connection with the process 1100 may be performed mechanically, by software, hardware, firmware, or any combination thereof. It should be appreciated that the process 1100 may include any number of additional or alternative tasks, the tasks shown in FIG. 11 need not be performed in the illustrated order, and the process 1100 may be incorporated into a more comprehensive procedure or process having additional functionality not described in detail herein.

For illustrative purposes, the following description of the process 1100 may refer to elements mentioned above in connection with FIGS. 1-4 and 10. In practical embodiments, portions of the process 1100 may be performed by different elements of the systems 100 and 300 such as: the CPU 50, the memory module 60, the video encoder 301, the audio encoder 302, the GPS module 303, the key input circuit 304, the clock circuit 305, the communication module 306, the back light drive circuit 307, the video decoder 308, the audio decoder 309, the external speaker 310, the first display 11, the second display 21, etc. The process 1100 may have functions, material, and structures that are similar to the embodiments shown in FIGS. 1-4 and 10. Therefore common features, functions, and elements may not be redundantly described here.

In this case, if the current location is at the business-related location (YES branch of inquiry task S203), the CPU 50 causes the first display 11 to display the business-related schedule information (task S205), and if it is not at the business-related location (NO branch of inquiry task S203), the CPU 50 causes the second display 21 to display the personal schedule information (task S208).

Figure 12:
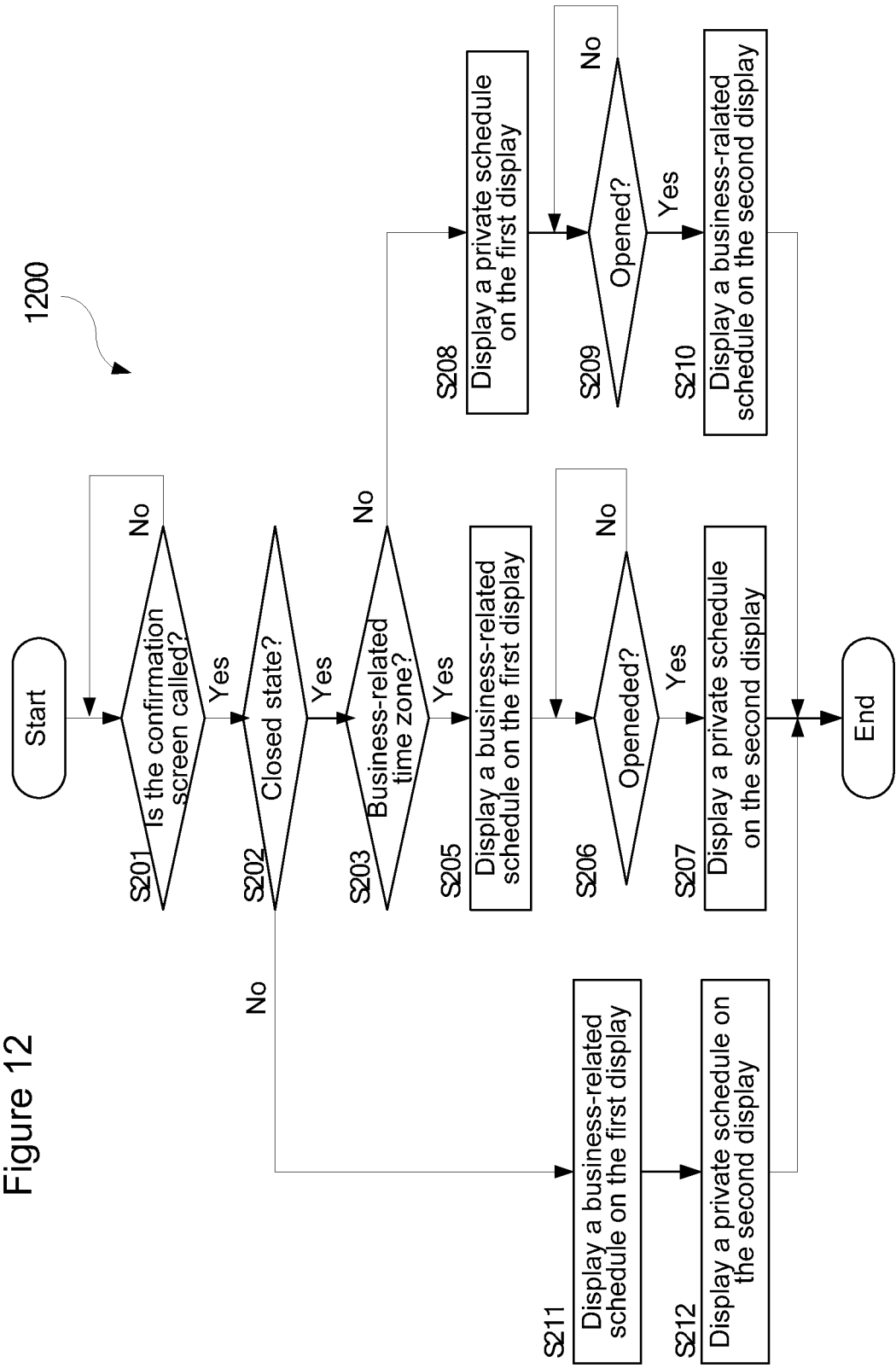
FIG. 12 is an illustration of an exemplary flow diagram showing a control process for displaying the schedule information according to an embodiment of the disclosure.

FIG. 12 is an illustration of an exemplary flow diagram showing a process 1200 for displaying the schedule information according to an embodiment of the disclosure. Process 1200 determines the time as compared to the process 1200 where both the location and the time are determined. The various tasks performed in connection with the process 1200 may be performed mechanically, by software, hardware, firmware, or any combination thereof. It should be appreciated that the process 1200 may include any number of additional or alternative tasks, the tasks shown in FIG. 12 need not be performed in the illustrated order, and the process 1200 may be incorporated into a more comprehensive procedure or process having additional functionality not described in detail herein.

For illustrative purposes, the following description of the process 1200 may refer to elements mentioned above in connection with FIGS. 1-4. In practical embodiments, portions of the process 1200 may be performed by different elements of the systems 100 and 300 such as: the CPU 50, the memory module 60, the video encoder 301, the audio encoder 302, the GPS module 303, the key input circuit 304, the clock circuit 305, the communication module 306, the back light drive circuit 307, the video decoder 308, the audio decoder 309, the external speaker 310, the first display 11, the second display 21, etc. The process 1200 may have functions, material, and structures that are similar to the embodiments shown in FIGS. 1-4 and 11. Therefore common features, functions, and elements may not be redundantly described here.

In this case, if the current time is in the business-related time zone (YES branch of inquiry task S204), the CPU 50 causes the first display 11 to display the business-related schedule information (task S205), and if it is not in the business-related time zone (NO branch of inquiry task S204), the CPU 50 causes the second display 21 to display the personal schedule information (task S208).

FIG. 13 is an illustration of an exemplary flow diagram showing a process 1300 when a scroll operation is performed on the confirmation screen of the schedule information according to an embodiment of the disclosure. Additionally, FIGS. 14A and B are illustrations of an exemplary display screen when a scroll operation is performed while the second housing is closed, and FIGS. 15A and B are illustrations of an exemplary display screen when a scroll operation is performed while the second housing is open.

The various tasks performed in connection with the process 1300 may be performed mechanically, by software, hardware, firmware, or any combination thereof. It should be appreciated that the process 1300 may include any number of additional or alternative tasks, the tasks shown in FIG. 13 need not be performed in the illustrated order, and the process 1300 may be incorporated into a more comprehensive procedure or process having additional functionality not described in detail herein.

For illustrative purposes, the following description of the process 1300 may refer to elements mentioned above in connection with FIGS. 1-4. In practical embodiments, portions of the process 1300 may be performed by different elements of the systems 100 and 300 such as: the CPU 50, the memory module 60, the video encoder 301, the audio encoder 302, the GPS module 303, the key input circuit 304, the clock circuit 305, the communication module 306, the back light drive circuit 307, the video decoder 308, the audio decoder 309, the external speaker 310, the first display 11, the second display 21, etc. The process 1300 may have functions, material, and structures that are similar to the embodiments shown in FIGS. 1-4 and FIG. 12. Therefore common features, functions, and elements may not be redundantly described here.

The CPU 50 determines whether or not a scroll operation is performed in the state in which the confirmation screen is displayed (inquiry task S301). For example, when the display surface is traced from top to bottom by the user's fingers, etc., the CPU 50 determines that an operation for moving down the current screen is performed, and when the display surface is traced from bottom to top, it determines that an operation for moving up the current screen is performed.

Figure 14B:
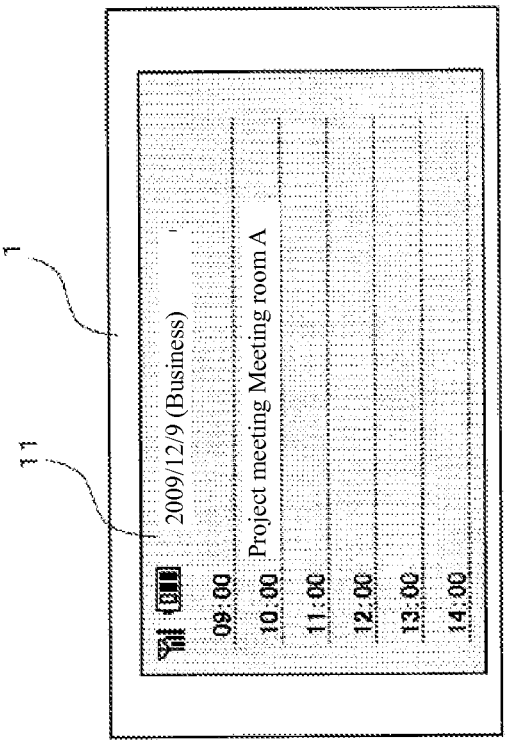
FIGS. 14A and B are illustrations of an exemplary display screen when a scroll operation is performed while the second housing is closed.
Figure 14A:
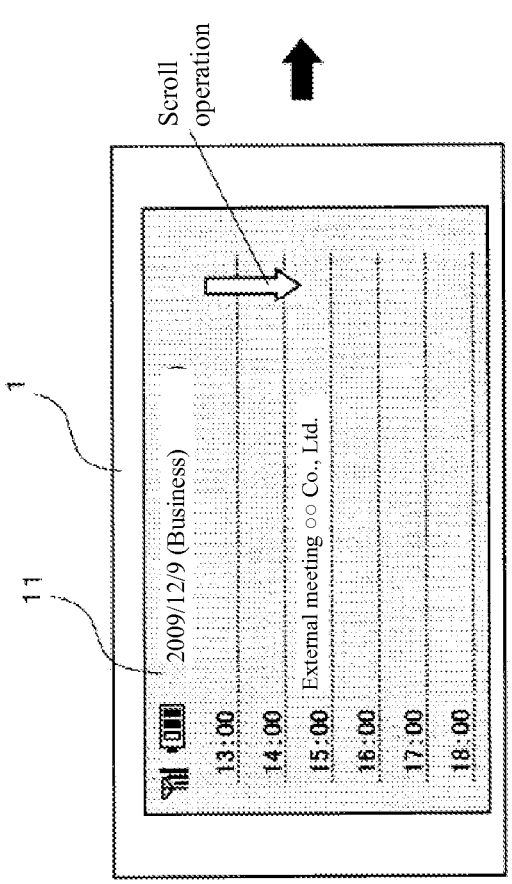

If the second housing 2 is closed (YES branch of inquiry task S302) when the scroll operation is performed (YES branch of inquiry task S301), the CPU 50 causes the confirmation screen of the first display 11 to scroll according to the scroll operation (task S303). Once the first display 11 is scrolled from top to bottom as shown in FIG. 14A, it is scrolled to the confirmation screen of the previous time zone as shown in FIG. 14B.

Figure 15B:
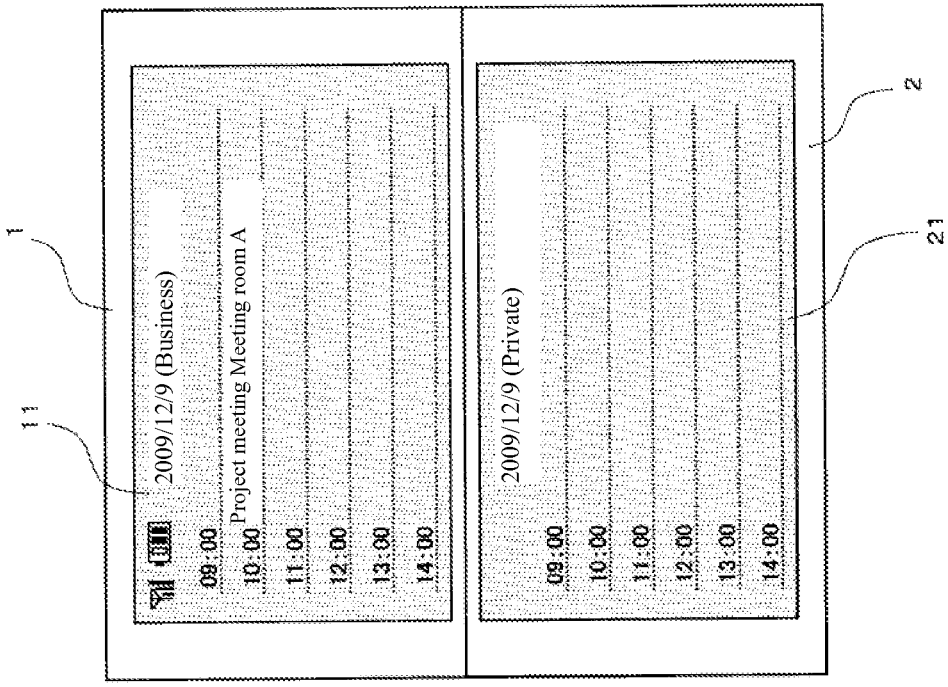
FIGS. 15A and B are illustrations of an exemplary display screen when a scroll operation is performed while the second housing is open.
Figure 15A:
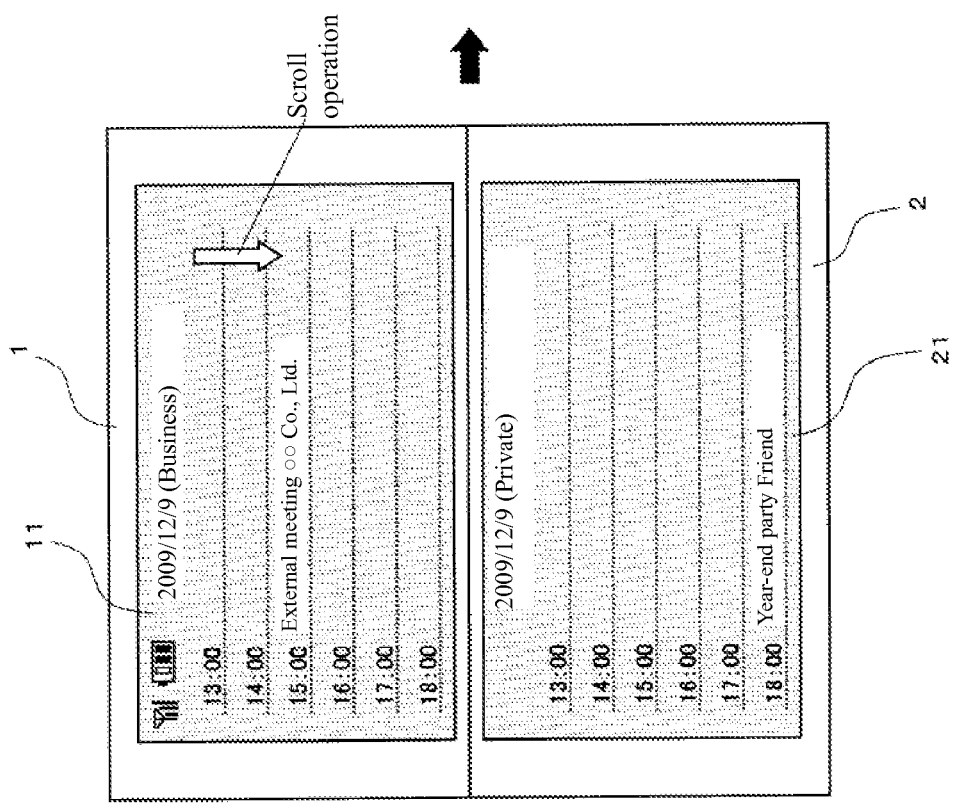

If the second housing 2 is opened (NO branch of inquiry task S302) when the scroll operation is performed (YES branch of inquiry task S301), even if the scroll operation is performed on either the first display 11 or the second display 21, the CPU 50 causes another display to scroll in the same manner by interlocking with the scroll of the operated display (task S304). Once the first display 11 is scrolled from top to bottom (FIG. 15A), both the displays 11 and 21 are scrolled to the confirmation screen of the previous time zone (FIG. 15B).

In this way, by interlocking and scrolling the two displays, the business-related schedule information and the personal schedule information in the same time zone can be confirmed easily.

As described above, by setting the second housing 2 in the closed state while working (during private time), the user can easily confirm the business-related (private) schedule information only through the first display 11. Additionally, there is no possibility that the private (business-related) schedule information is viewed by another person. Moreover, when the user wants to view the private (business-related) schedule information, the private (business-related) schedule information can be confirmed easily by opening the second housing 2.

When it is likely to be used while working, the business-related schedule information is displayed on the first display 11 in the state in which the second housing 2 is closed, while when it is likely to be used during private time, the personal schedule information is displayed on the first display 11 in the state in which the second housing 2 is closed. That is, when the schedule is displayed on one display, the schedule information of the desired group is displayed depending on the situation; hence, the user does not have to switch the display sequentially; therefore, the user's usability is improved.

Figure 16:
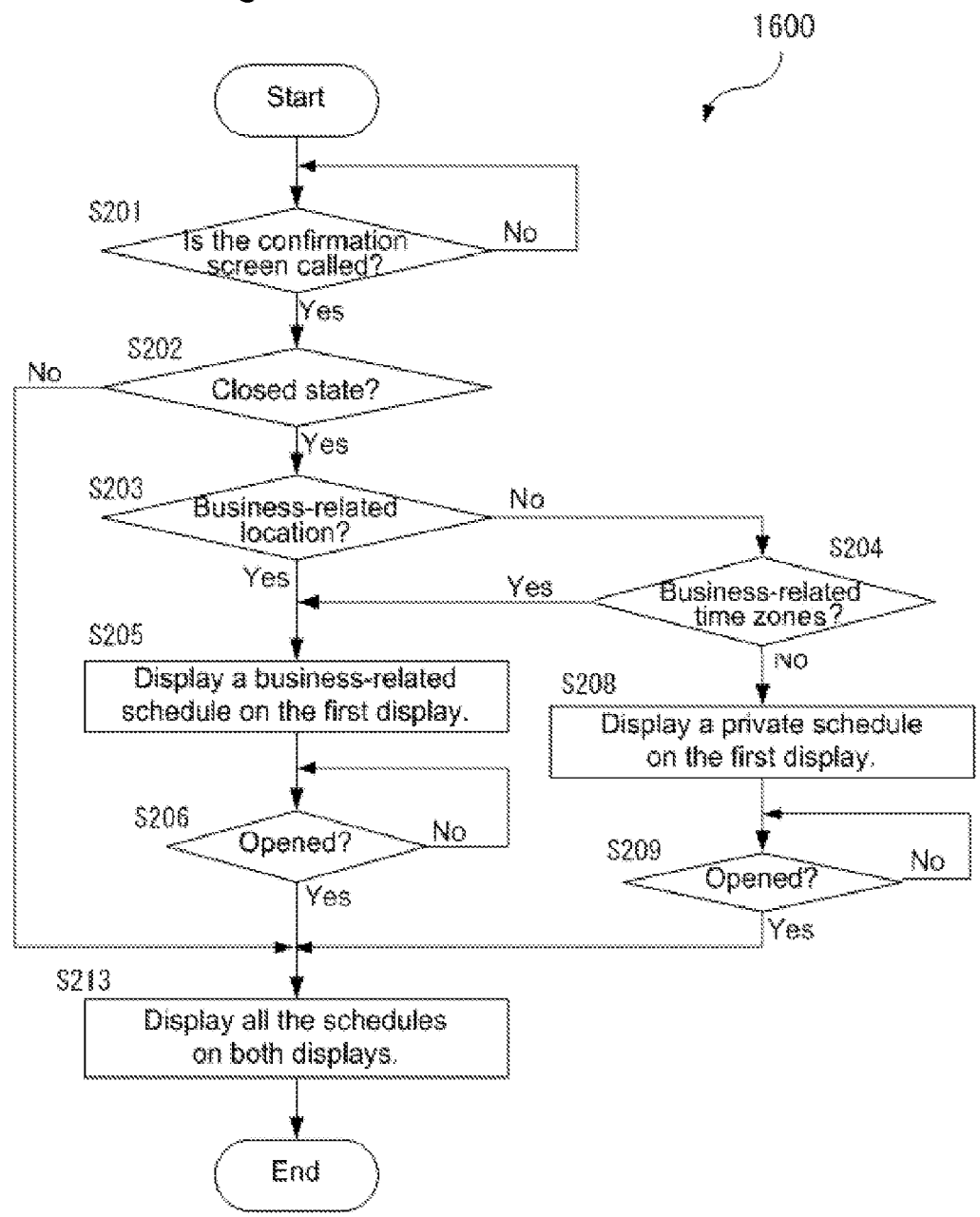
FIG. 16 is an illustration of an exemplary flow diagram showing a control process for displaying the schedule information.

FIG. 16 is a flowchart showing a process 1600 for displaying the schedule information according to an embodiment of the disclosure. FIG. 17 is a diagram showing a display example of the confirmation screen of the schedule information according to an embodiment of the disclosure. The various tasks performed in connection with the process 1600 may be performed mechanically, by software, hardware, firmware, or any combination thereof. It should be appreciated that the process 1600 may include any number of additional or alternative tasks, the tasks shown in FIG. 16 need not be performed in the illustrated order, and the process 1600 may be incorporated into a more comprehensive procedure or process having additional functionality not described in detail herein.

For illustrative purposes, the following description of the process 1600 may refer to elements mentioned above in connection with FIGS. 1-4. The process 1600 is further described herein especially with reference now to FIG. 17. In practical embodiments, portions of the process 1600 may be performed by different elements of the systems 100 and 300 such as: the CPU 50, the memory module 60, the video encoder 301, the audio encoder 302, the GPS module 303, the key input circuit 304, the clock circuit 305, the communication module 306, the back light drive circuit 307, the video decoder 308, the audio decoder 309, the external speaker 310, the first display 11, the second display 21, etc. The process 1600 may have functions, material, and structures that are similar to the embodiments shown in FIGS. 1-4. Therefore common features, functions, and elements may not be redundantly described here.

Although, in the state in which the second housing 2 is opened, the business-related schedule information and the personal schedule information are unified on a time axis respectively and displayed on of the respective displays 11 and 21, the display format of both the displays 11 and 21 can be set as follows.

Instead of the processes of steps S207, S210 to S212 in FIG. 7, the process of step S213 in FIG. 16 is executed. When the second housing 2 is in the opened state (YES branch of inquiry task S202, YES branch of inquiry task S206, YES branch of inquiry task S209), the CPU 50 uses both the displays 11 and 21 to display all of the schedule information at each time, as shown in FIG. 17B.

Again, in this case, the user can scroll the display up and down by the scroll operation such as tracing the screen in the states shown in FIGS. 17A and 17B. Based on this, the schedule in the desired time zone can be confirmed conveniently.

Figure 18:
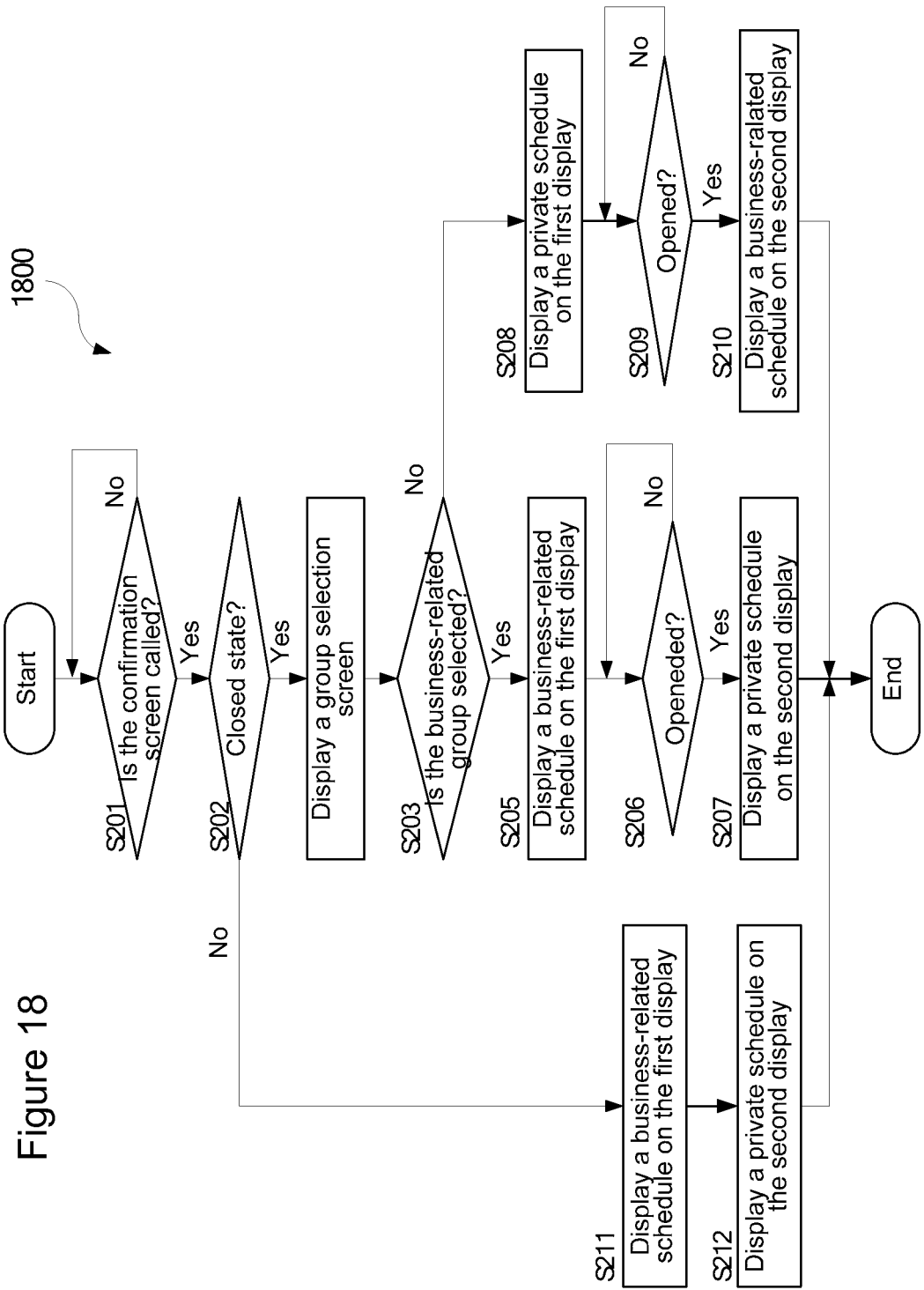
FIG. 18 is an illustration of an exemplary flow diagram showing a control process for displaying the schedule information according to an embodiment of the disclosure.

FIG. 18 is an illustration of an exemplary flowchart showing a process 1800 for displaying the schedule information according to an embodiment of the disclosure. FIG. 19A is a diagram showing a display example of the selection screen for selecting the group that is displayed on the first display 11 in the state in which the second housing 2 is closed. FIGS. 19B and C are diagrams showing display examples of the confirmation screen that is displayed in response to the selection on the selection screen.

The various tasks performed in connection with the process 1800 may be performed mechanically, by software, hardware, firmware, or any combination thereof. It should be appreciated that the process 1800 may include any number of additional or alternative tasks, the tasks shown in FIG. 18 need not be performed in the illustrated order, and the process 1800 may be incorporated into a more comprehensive procedure or process having additional functionality not described in detail herein.

For illustrative purposes, the following description of the process 1800 may refer to elements mentioned above in connection with FIGS. 1-4. The process 1800 is further described herein especially with reference now to FIGS. 19A-19B. In practical embodiments, portions of the process 1800 may be performed by different elements of the systems 100 and 300 such as: the CPU 50, the memory module 60, the video encoder 301, the audio encoder 302, the GPS module 303, the key input circuit 304, the clock circuit 305, the communication module 306, the back light drive circuit 307, the video decoder 308, the audio decoder 309, the external speaker 310, the first display 11, the second display 21, etc. The process 1800 may have functions, material, and structures that are similar to the embodiments shown in FIGS. 1-4. Therefore common features, functions, and elements may not be redundantly described here.

Although the schedule information that is displayed on the first display 11 is selected automatically depending on the location or the time zone when the second housing 2 is closed, the schedule information that is displayed on the first display 11 may be selected by the user, as shown in this modified example.

That is, instead of the processes of task S203 and task S204 shown in FIG. 7, the processes of task S214 and task S215 shown in FIG. 18 are executed. If the second housing 2 is closed (YES branch of inquiry task S202) when the calling operation of the confirmation screen is performed (YES branch of inquiry task S201), the CPU 50 causes the first display 11 to display the selection screen for selecting the group, as shown in FIG. 19A (task S214). Subsequently, when the group, namely "Business", is selected by the user in this selection screen (YES branch of inquiry task S215), the business-related schedule information is displayed on the first display 11, as shown in FIG. 19B (task S205). On the other hand, when the group, namely "Private", is selected by the user (YES branch of inquiry task S215), the personal schedule information is displayed on the first display 11, as shown in FIG. 19C (task S208).

However, instead of the configuration in which the user is asked to select each time the confirmation screen is called, it may be configured such that any of the groups can be selected previously by the user. In this case, when the confirmation screen is called, the schedule information of the previously set group is displayed on the first display 11.

Although the example that is applied to functions of the schedule management has been described, it can be applied to the functions of an address book.

FIG. 20 and FIG. 21 are diagrams showing display examples of the confirmation screen of address information according to an embodiment of the disclosure.

By executing a control process related to registration that is similar to that shown in FIG. 5, address information is registered in a database related to the address information (hereinafter referred to as "address database") in the memory module 60. For example, names, phone numbers, addresses, e-mail addresses, photographic images, etc., are registered in the address database as the address information, and the business-related flag or the personal flag is set to the individual address information.

The synchronization setting of the address information is performed between the mobile phone and the personal computer at the office or at home.

Figure 20B:
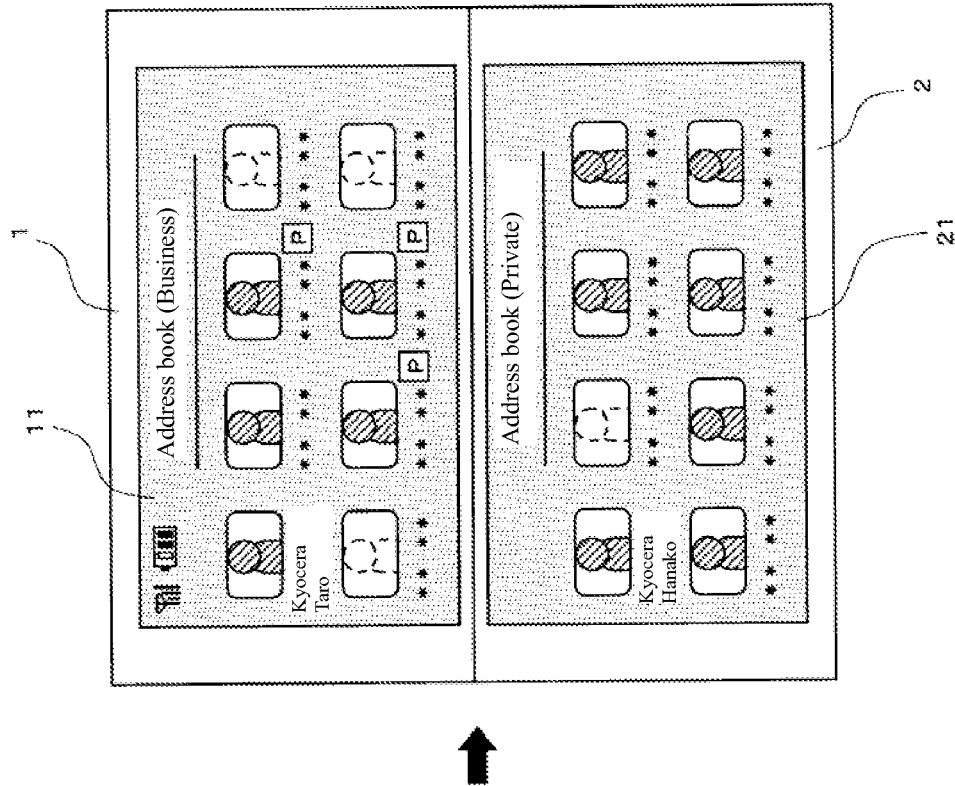
FIGS. 20A-B are illustrations of an exemplary display screen of the confirmation screen of address information according to an embodiment of the disclosure.
Figure 20A:
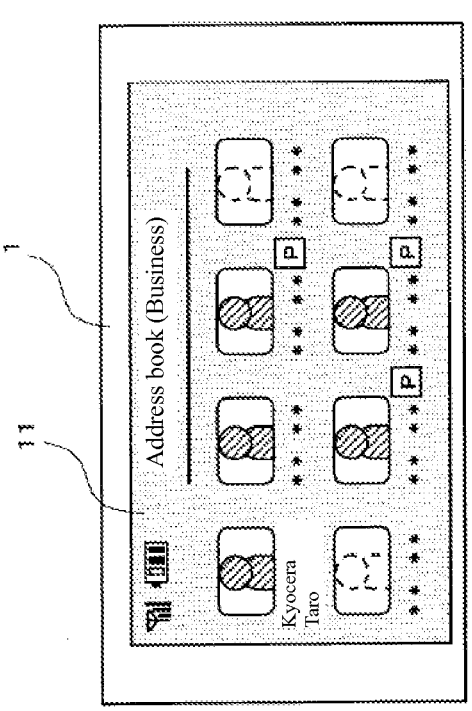

The control process related to the displays similar to FIG. 7, FIG. 11, or FIG. 12 is performed. That is, as shown in FIG. 20, in the case in which the calling operation of the confirmation screen of the address information is performed in the state in which the second housing 2 is closed, if it is at the business-related location or in the business-related time zone, as shown in FIG. 20A, the business-related address information, for example, a photographic image and a name of the address information that is registered in the address database, is displayed on the first display 11. Subsequently, once the second housing 2 is opened, as shown in FIG. 20B, the personal address information is displayed on the second display 21.

Figure 21B:
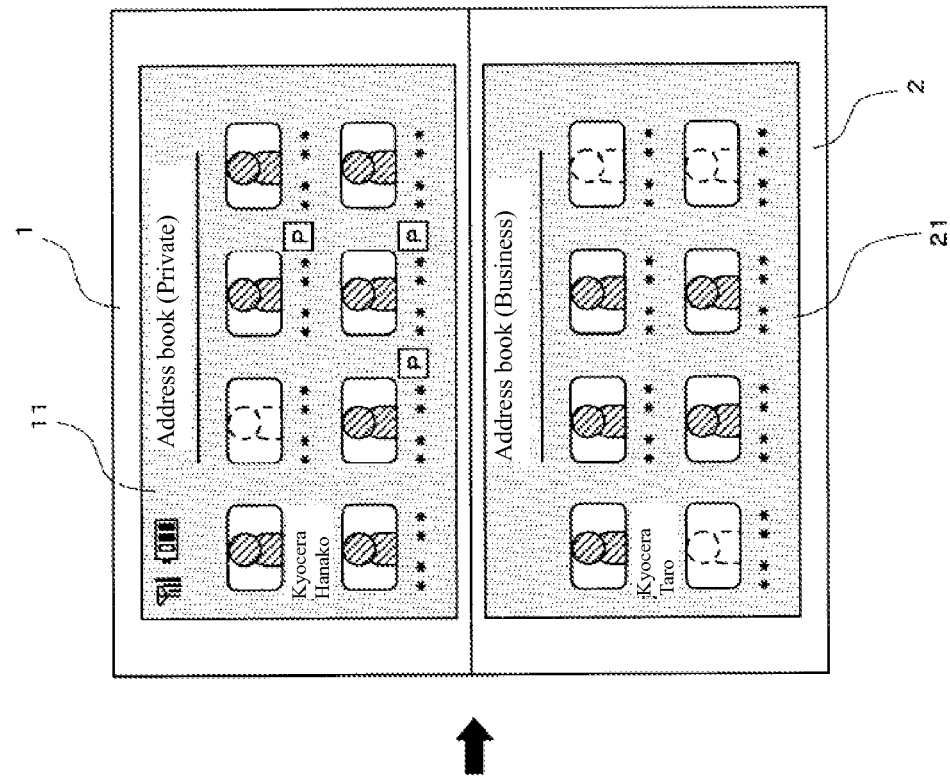
FIGS. 21A-B are illustrations of an exemplary display screen of the confirmation screen of address information.
Figure 21A:
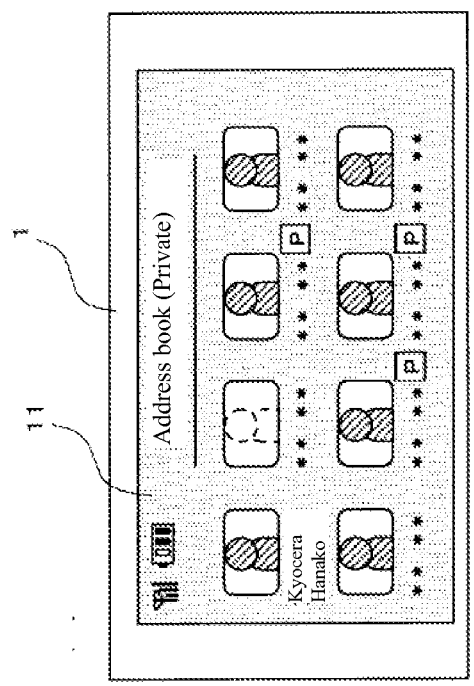

Similarly, in the case in which the calling operation of the confirmation screen of the address information is performed in the state in which the second housing 2 is closed, if it is at the private location or in the private time zone, as shown in FIG. 21A, the personal address information is displayed on the first display 11. Subsequently, once the second housing 2 is opened, as shown in FIG. 21B, the business-related address information is displayed on the second display 21.

In the case of the address information, the address information that is common to the business and the personal information may be present. In this case, in the address database, both the business-related flag and personal flag are set. Subsequently, as shown in FIG. 20 and FIG. 21, in the state in which only the first display 11 is displayed, a mark that indicates it being common (for example, a mark "P" in a square) is provided to the address information that is common to business and private. However, when the display state is switched to the display state by both the displays 11 and 21, the common address information is not displayed on the second display 21. Additionally, in FIG. 20 and FIG. 21, with regard to the address information without a photographic image, the person is represented by a broken line.

The control processes that are related to the scroll operations described in FIGS. 13, 14A, 14B, 15A and 15B may be executed.

In the abovementioned embodiment, once the second housing 2 is opened, the business-related (private) schedule information is displayed on the first display 11 and the private (business-related) schedule information is displayed on the second display 21; however, when such a display format shall be a first mode, the first mode and a second mode that is described below may be selectively executed.

FIG. 22 to FIG. 24 are diagrams showing display examples of the confirmation screen of the schedule information in the second mode according to an embodiment of the disclosure.

Figure 22B:
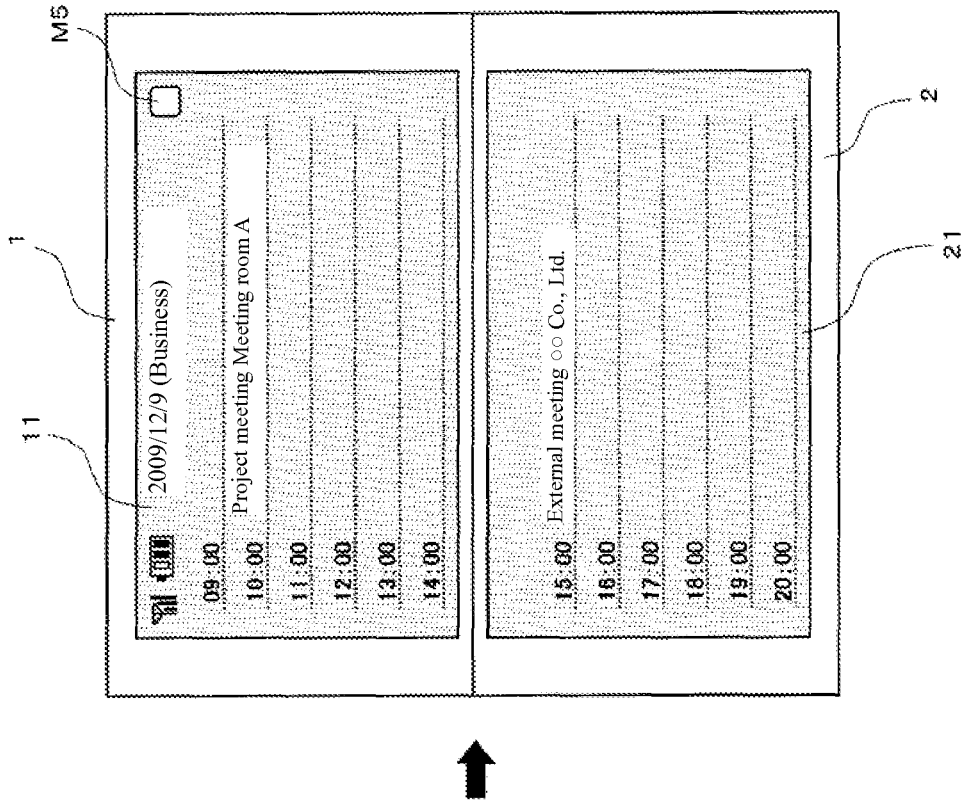
FIGS. 22A-B are illustrations of an exemplary display screen of the confirmation screen of schedule information in a second mode.
Figure 22A:
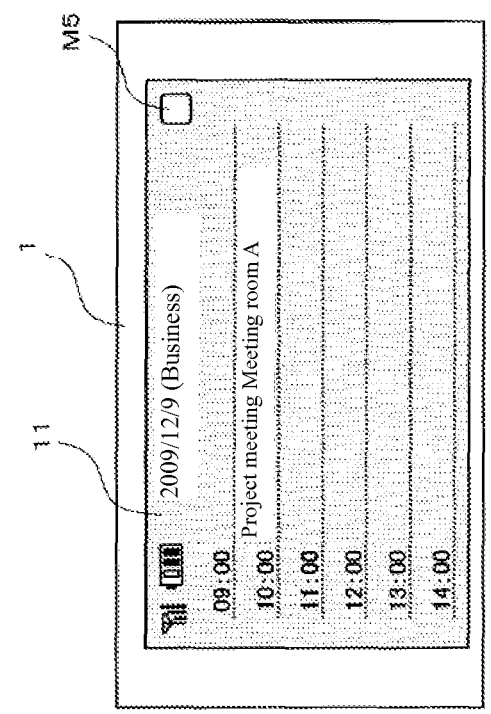
Figure 23A:
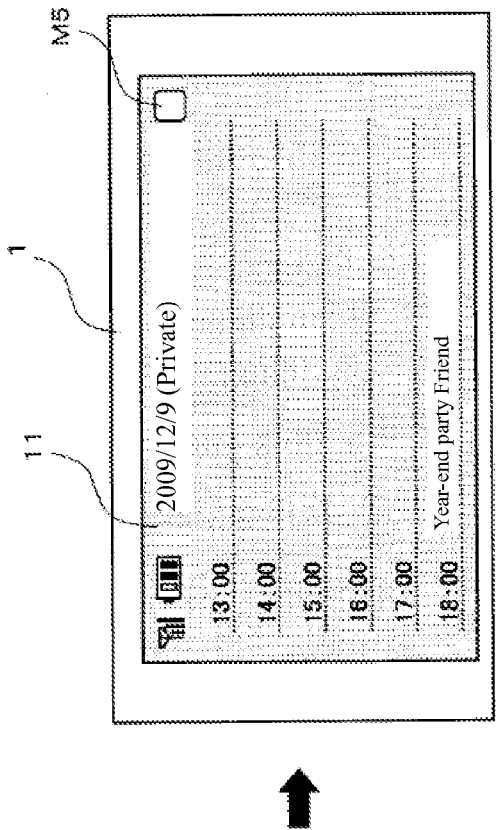
FIGS. 23A-B are illustrations of an exemplary display screen of the confirmation screen of schedule information in a second mode.

When the second mode is selected, once the second housing 2 is opened in the state in which the business-related schedule information is displayed only on the first display 11 (FIG. 22A), a confirmation screen that follows the confirmation screen of the business-related schedule information displayed on the first display 11 is displayed on the second display 21 (FIG. 22B).

Figure 23B:
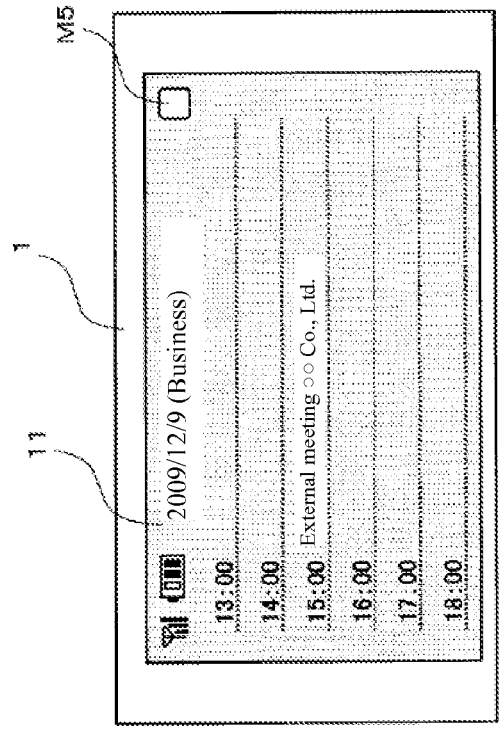

On the first display 11, a switching key M5 is displayed. When the switching key M5 is pressed in the state in which the business-related schedule information is displayed (FIG. 23A), it reaches the state in which the personal schedule information is displayed (FIG. 23B). If the switching key M5 is pressed again, the display state is restored to the state shown in FIG. 23A from the state shown in FIG. 23B.

Figure 24B:
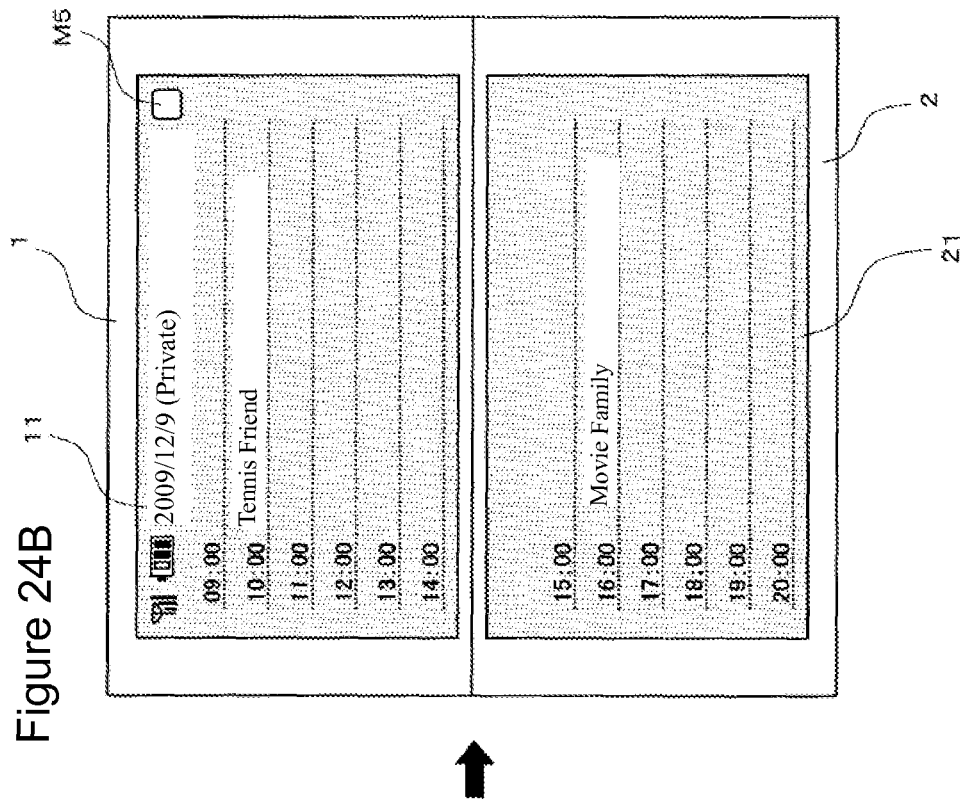
FIGS. 24A-B are illustrations of an exemplary display screen of the confirmation screen of schedule information in a second mode.
Figure 24A:
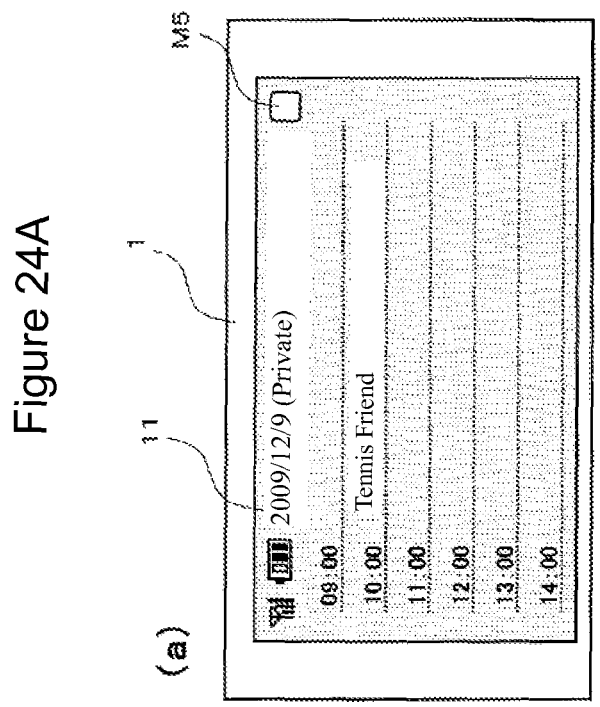

Once the second housing 2 is opened in the state in which the personal schedule information is displayed only on the first display 11 (FIG. 24A), a confirmation screen that follows the confirmation screen of the personal schedule information displayed on the first display 11 is displayed on the second display 21 (FIG. 24B).

In the state shown in FIG. 22B, it is possible that when the switching key M5 is pressed, the display state is switched to the state shown in FIG. 24B. When the switching key M5 is pressed in the state shown in FIG. 24B, the business-related schedule information may be displayed on the first display 11 and the personal schedule information may be displayed on the second display 21.

In this way, by providing the second mode, the range of the display format is widened, and the user's usability is further improved.

The configurations shown in FIG. 22 to FIG. 24 can be applied to the embodiments shown in FIG. 20 and FIG. 21.

Although once the second housing 2 is opened in the state in which the business-related (private) schedule information is displayed on the first display 11, the business-related (private) schedule information is displayed on the first display 11 continuously and the private (business-related) schedule information is displayed on the second display 21, in contrast, it may be configured such that once the second housing 2 is opened in the state in which the business-related (private) schedule information is displayed on the first display 11, the private (business-related) schedule information is newly displayed on the first display 11 and the business-related (private) schedule information is displayed on the second display 21.

In the registration screen shown in FIG. 6, it is configured such that the user can select any one group from the two groups, namely "Business" and "Private". The schedule information is registered in the schedule database with the identification flag that corresponds to the selected group. However, it is possible that the two groups, namely "Business" and "Private", are divided into sub-groups, such as "Business (limited sense)", "Meeting", "Business trip", etc., for the "Business" group, and for the "Private" group, divided into sub-groups, such as "Dating", "Meal", "Hobby", etc., and these sub-groups may be displayed on the registration screen. The schedule information is registered in the schedule database by adding the identification flag that corresponds to the selected sub-group.

In this case, for example, when the schedule information that belongs to the "Business" group, is displayed, the schedule information in which the identification flag of the sub-groups ("Business (limited sense)", "Meeting", "Business trip", etc.) that belong to the "Business" group is set is read from the schedule database. Additionally, when the schedule information that belongs to the "Private" group is displayed, the schedule information in which the identification flag of the sub-groups ("Dating", "Meal", "Hobby", etc.) that belong to the "Private" group is set is read from the schedule database.

Although the two groups of the business-related group and the private group may be set, it is not limited to the "Business" and "Private" and other grouping may be set. For example, it may be grouped into a "family member" and a "non-family member". In this case, for example, position information of a home and a time zone while the user is at home are registered with a condition registration screen that is similar to that of shown in FIG. 10A, wherein, in task S203, whether or not the current location is at the location that is related to the family is determined, and in step S204, whether or not the current time is in the time zone that is related to the family is determined, by the control process that is similar to that shown in FIG. 7, FIG. 11, or FIG. 12. Subsequently, when the current location is at home or when the current time is in the time zone while the user is considered to be at home, family-related schedule information is displayed on the first display 11 in the state in which the second housing 2 is closed.

It may be configured such that the schedule information is divided into three or more groups. For example, groupings into three groups, namely "Business", "Culture lesson", "Free", groupings into four groups, namely "School", "Club activity", "Culture lesson", "Free", etc., are considered. In this case, in the state in which the second housing 2 is opened, on the second display 21, the schedule information of all of groups other than one group that is displayed on the first display 11 may be displayed. Alternatively, on the second display 21, the schedule information of one of the groups that is previously selected by the user from the other groups may be displayed. Furthermore, on the second display 21, the schedule information of any other groups may be displayed and it may be further switched to another group by the switching key M5 shown in the FIG. 22. Additionally, similarly to the case shown in FIG. 17, in the state in which the second housing 2 is opened, the schedule information of all of the groups may be displayed on the first display 11 and the second display 21.

The user may set what kind of a grouping, such as a grouping by "Business" and "Private", a grouping by "Family member" and "Not family member", etc., is to be performed. This allows the user to perform a desired grouping by considering which matter, such as "Business" or "Family", is to be given a priority.

Although whether or not which group the schedule information belongs to is identified by the identification flag, the group may be identified by building a different database for each group in the memory module 60.

It is configured such that the identification flag of the schedule database is set depending on whether the personal computer into which the schedule information is transmitted is the personal computer at the office or the personal computer at home. However, it may be configured such that, regardless of the personal computer of the sender, in the case in which the identification information for identifying whether it is business-related or private is added to the schedule information, the identification flag is set according to the identification information.

It is configured such that a synchronization setting of the schedule information is performed between the mobile phone and a scheduler of a personal computer at the office or at home. However, it may be configured such that it is not limited this and the synchronization setting of the schedule information is performed with the schedule management function on a website. In this case, the schedule information is transmitted from a web server, and at that time, the identification information for identifying whether it is business-related or private is added to the schedule information. Therefore, on the mobile phone side, the identification flag may be set in the schedule database by determining the identification information.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the disclosure.

Additionally, memory or other storage, as well as communication components, may be employed in embodiments of the disclosure. It will be appreciated that, for clarity purposes, the above description has described embodiments of the disclosure with reference to different functional units and processors. However, it will be apparent that any suitable distribution of functionality between different functional units, processing logic elements or domains may be used without detracting from the disclosure. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. In addition, the inclusion of a feature in one category of claims does not imply a limitation to this category, but rather the feature may be equally applicable to other claim categories, as appropriate.

It will be appreciated that, for clarity purposes, the above description has described embodiments of the disclosure with reference to different functional units and processors. However, it will be apparent that any suitable distribution of functionality between different functional units, processors or domains may be used without detracting from the disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

In this document, the terms "computer program product", "computer-readable medium", and the like may be used generally to refer to media such as, for example, memory, storage devices, or storage unit. These and other forms of computer-readable media may be involved in storing one or more instructions for use by the processor module 20 to cause the processor module 20 to perform specified operations. Such instructions, generally referred to as "computer program code" or "program code" (which may be grouped in the form of computer programs or other groupings), when executed, enable a grid-menu display-control method of the mobile device 10.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present disclosure may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile terminal device, comprising:
   a first display screen in a first housing and a second display screen in a second housing, the second housing different from the first housing;
   a switching module operable to switch between
   a first state in which the first display screen is viewable to a user of the mobile terminal device while the second display screen is not viewable to the user, and
   a second state in which both the first display screen and the second display screen are viewable to the user; and
   a control module operable to:
   present private schedule information on the first display screen, in the first state while not presenting business schedule information on the first display screen, and
   present the business schedule information on the first display screen and the second display screen in the second state while presenting the private schedule information neither on the first display screen nor the second display screen,
   wherein in the second display state the presented business schedule information includes a same time period as the time period of the previously presented private schedule information.

* * * * *